US012116835B1

(12) United States Patent
Earnest

(10) Patent No.: US 12,116,835 B1
(45) Date of Patent: Oct. 15, 2024

(54) OVERHEAD GARAGE DOOR SELECTIVELY INFLATABLE SEAL APPARATUS AND METHOD OF INSTALLATION AND USE

(71) Applicant: GRIDZ LLC, Knoxville, TN (US)

(72) Inventor: William Keith Earnest, Louisville, TN (US)

(73) Assignee: GRIDZ LLC, Knoxville, TN (US)

( * ) Notice: Subject to any disclaimer, the term of this patent is extended or adjusted under 35 U.S.C. 154(b) by 0 days.

(21) Appl. No.: 18/396,591

(22) Filed: Dec. 26, 2023

(51) Int. Cl.
*E06B 7/23* (2006.01)

(52) U.S. Cl.
CPC .................................. *E06B 7/2318* (2013.01)

(58) Field of Classification Search
CPC .............................. E06B 7/2318; B60J 10/244
See application file for complete search history.

(56) References Cited

U.S. PATENT DOCUMENTS

| | | | | | |
|---|---|---|---|---|---|
| 2,413,915 | A * | 1/1947 | Frankel | B60C 5/24 | 152/338.1 |
| 2,629,905 | A * | 2/1953 | Kessler | E06B 7/2318 | 49/318 |
| 3,126,048 | A * | 3/1964 | Hollands | E06B 7/20 | 160/40 |
| 3,401,647 | A * | 9/1968 | Ingram | E06B 7/2318 | 105/377.08 |
| 4,040,210 | A * | 8/1977 | Land | E06B 9/24 | 160/90 |
| 4,098,035 | A * | 7/1978 | Bessler | E06B 3/285 | 52/202 |
| 4,141,179 | A * | 2/1979 | Newson | E06B 7/18 | 49/316 |
| 4,156,989 | A * | 6/1979 | Sparrow | E06B 7/2318 | 49/304 |
| 4,250,941 | A * | 2/1981 | McNally | E06B 7/2318 | 160/209 |
| 4,355,000 | A * | 10/1982 | Lumelleau | E06B 7/2318 | 376/205 |

(Continued)

FOREIGN PATENT DOCUMENTS

| | | | | |
|---|---|---|---|---|
| CA | 2376498 A1 | 9/2003 | | |
| DE | 20310095 U1 * | 9/2023 | | E06B 9/00 |

(Continued)

OTHER PUBLICATIONS

North Shore Commercial Door website screenshots "Garage Door Inflatable Bottom Weather Seal Inner Tube" taken from https://www.northshorecommercialdoor.com/gadoinbowese.html on Dec. 26, 2023.

(Continued)

*Primary Examiner* — Catherine A Kelly
(74) *Attorney, Agent, or Firm* — Master Key IP, LLP; Jeromye V. Sartain

(57) ABSTRACT

An inflatable seal apparatus for selectively sealing a garage door within an opening, the apparatus having a plurality of inflatable members arranged with a seal body configured for selectively sealing the garage door opening, each inflatable member having one or more of an inflatable member side wall and an inflatable member end wall and having an inflation valve operably installed within the inflatable member side wall or the inflatable member end wall so as to be accessible through the seal body.

15 Claims, 16 Drawing Sheets

(56) References Cited

U.S. PATENT DOCUMENTS

| | | | | | |
|---|---|---|---|---|---|
| 4,371,175 | A * | 2/1983 | Van Dyk, Jr. | E06B 7/2318 | 277/646 |
| 4,993,722 | A * | 2/1991 | Gundy | F16J 15/46 | 277/606 |
| 5,384,982 | A * | 1/1995 | Galperin | E05F 15/44 | 49/27 |
| 5,728,984 | A | 3/1998 | Miller | | |
| 5,839,227 | A * | 11/1998 | Gardner | H01H 3/142 | 49/27 |
| 6,125,591 | A * | 10/2000 | Schmidhuber | B60J 10/40 | 49/477.1 |
| 6,152,208 | A | 11/2000 | Kalempa et al. | | |
| 6,167,657 | B1 * | 1/2001 | Burge | B29C 48/12 | 156/244.11 |
| 6,286,257 | B1 * | 9/2001 | Gregoriou | E05F 15/44 | 49/27 |
| 6,360,489 | B1 | 3/2002 | Burge et al. | | |
| 6,374,567 | B1 * | 4/2002 | Mullet | E06B 9/582 | 52/717.03 |
| 6,427,382 | B2 * | 8/2002 | Gregoriou | E05F 15/44 | 49/27 |
| 6,772,560 | B2 | 8/2004 | Dischiant et al. | | |
| 7,178,810 | B1 * | 2/2007 | Kuhary | F16J 15/061 | 277/921 |
| 7,216,396 | B2 * | 5/2007 | Slawinski | B08B 5/02 | 15/301 |
| 7,958,674 | B2 * | 6/2011 | Meister | E06B 7/2318 | 49/306 |
| 7,963,075 | B2 * | 6/2011 | Howland | A62C 3/0257 | 160/40 |
| 8,454,269 | B2 * | 6/2013 | Johnson | E02B 3/108 | 405/110 |
| 8,492,660 | B2 * | 7/2013 | Carducci | H05K 9/0001 | 49/467 |
| 8,595,983 | B2 * | 12/2013 | Gaviglia | E06B 7/2318 | 49/501 |
| 9,045,937 | B2 | 6/2015 | Peck et al. | | |
| 9,068,391 | B2 | 6/2015 | Peck et al. | | |
| 9,334,007 | B2 * | 5/2016 | Huennekens | B62K 15/008 | |
| 9,636,983 | B2 * | 5/2017 | Hindman | B60J 5/14 | |
| 9,745,798 | B2 * | 8/2017 | Preising, Jr. | E06B 7/2314 | |
| 9,845,638 | B1 | 12/2017 | Cunningham | | |
| 10,329,835 | B2 * | 6/2019 | Geyser | E04B 1/68 | |
| 10,682,903 | B1 * | 6/2020 | Gandhi | B60J 10/70 | |
| 10,920,483 | B2 * | 2/2021 | Mutchnik | E06B 1/702 | |
| 11,252,850 | B1 * | 2/2022 | Rodgers | E06B 7/22 | |
| 11,260,694 | B2 * | 3/2022 | Johnson | B60C 5/04 | |
| 11,391,086 | B2 * | 7/2022 | Webb | E06B 7/2303 | |
| 11,473,366 | B2 * | 10/2022 | Gaviglia | E04B 1/92 | |

FOREIGN PATENT DOCUMENTS

| | | | | |
|---|---|---|---|---|
| EP | 1571284 | A2 * | 9/2005 | E06B 7/2318 |
| FR | 1391923 | A | 3/1965 | |
| FR | 2844826 | A1 | 3/2004 | |
| GB | 2549725 | A * | 11/2017 | E06B 7/2318 |

OTHER PUBLICATIONS

Garage Door Air Seal manual downloaded from North Shore Commercial Door website at https://www.northshorecommercialdoor.com/gadoinbowese.html on Dec. 26, 2023.

* cited by examiner

OVERHEAD GARAGE DOOR SELECTIVELY INFLATABLE SEAL APPARATUS AND METHOD OF INSTALLATION AND USE

BACKGROUND

The subject of this patent application relates generally to door seals, and more particularly to overhead garage door seals configured for sealing between the door and the floor or door frame.

The following description includes information that may be useful in understanding the present invention. It is not an admission that any of the information provided herein is prior art or relevant to the presently claimed invention, or that any publication specifically or implicitly referenced is prior art.

Applicant(s) hereby incorporate herein by reference any and all patents and published patent applications cited or referred to in this application, to the same extent as if each individual publication or patent application were specifically and individually indicated to be incorporated by reference. Where a definition or use of a term in an incorporated reference is inconsistent or contrary to the definition of that term provided herein, the 20) definition of that term provided herein applies and the definition of that term in the reference does not apply.

By way of background, overhead garage doors are widely known and used as having parallel horizontal sections that are interconnected by hinges and each have opposite rollers that operate in corresponding tracks mounted at the left and right sides of the garage structure adjacent the opening, each such track having a vertical portion that is substantially parallel to the front of the garage or building and a horizontal portion that is parallel to the floor and/or roof or ceiling of the garage or building with a curved portion of track therebetween, whereby the garage door can be operated whether manually or via a garage door motor assembly so as to shift between a substantially vertical closed position and a substantially horizontal open position. The typical sizes of such garage openings and thus such overhead garage doors are either eight feet (8 ft.) (single-car) or sixteen feet (16 ft.) (two-car) in width and approximately seven feet (7 ft.) in height made up of either three horizontal hinged door sections of approximately twenty-eight inches (28 in.) in height each or four horizontal hinged door sections of approximately twenty-one inches (21 in.) in height each. The related opening in which the garage door is installed is sized accordingly, the door frame generally comprising opposite vertical jambs and a horizontal header along with any related framing substructure or casing.

In the typical garage door installation, the overall perimeter of the door is roughly the same size as the overall structural opening the door is installed in or adjacent to and selectively opens and closes relative to. And based on the configuration of the track and roller system, the door is typically spaced inwardly from the opening, or from the jambs and header of the door frame, to ensure unrestricted movement of the door, such that there is a slight gap between the overhead garage door perimeter and the door frame opening. Similarly, when installed within the track system, the door is set to close substantially against the floor of the garage at the opening or threshold, though of course with both the floor and the overhead door sections being rigid, the door and floor cannot or should not themselves come into direct contact, such that typically along the bottom edge of the lowest section of the door there is installed a rubber sealing member to meet and somewhat seal against the floor and thus close the gap between the door and the floor when the door is in the closed position. Any such gaps around the door perimeter if unsealed allow for the passage of air, water, light, and debris from outside the structure into the garage and thus potentially damaging and certainly annoying water intrusion as well as thermal inefficiencies and noxious odors and noise both from the outside and from the door itself such as due to wind-induced whistling and rattling.

Referring to FIG. 1, there is shown a perspective view of an exemplary prior art overhead garage door G as operably installed within an opening O in a structure S such as a building or free-standing garage. The opening O is effectively defined by a door frame generally comprising opposite vertical jambs J and a horizontal header H along with any related framing substructure or casing (not shown) and any perimeter facing or header trim HT and jamb trim JT. To address the problem of the gap between the overhead garage door G at its perimeter and the door frame opening O, a trim seal T or weather seal or weatherstripping material is installed along the door frame, or jambs J and header H, positioned so as to contact and seal against the outer surface or face of the garage door G when in the closed position as within or adjacent to the opening O as shown. Such trim pieces T typically involve an elongate somewhat rectangular cross-section or profile body B having an elongate flexible flap F extending at an angle along one edge or surface of the trim piece body B, or specifically the edge oriented toward the garage door G when the trim seal T is installed on the door frame as shown (FIGS. 10-13). During installation, the trim piece body B is affixed to the door frame as by being cut into pieces of the appropriate length and nailed or screwed to the jambs J and header H, again, such that the flexible flap F is oriented inwardly so as to make contact with the face of the garage door G at its perimeter when closed, with the opposite front edge E of the trim seal body B being oriented outwardly or away from the garage door G. It is again the exposed edge E that can lead to a compromised trim seal T or a gap between the trim seal body B and the door frame due to buckling or bowing either during installation, such as by not cutting the trim seal body B to the proper length or using enough fasteners, or having the fasteners sufficiently close together, or over time due to weather and thermal effects. And to address the problem of the gap between the overhead garage door G at its bottom and the underlying floor L or other surface, there is typically installed along the bottom edge of the lowest section of the door a rubber sealing member or bottom seal W configured in size and shape to meet and seal against the floor L and thus close the gap between the door G and the floor L when the door G is in the closed position as shown. It will be appreciated that in practice the floor L may comprise a smooth concrete as most garage floors are formed from at least initially, as opposed to brushed concrete, aggregate, or other materials from which driveways are often fashioned, but in any case may be further coated with a surface treatment such as epoxy to reduce slip or prevent oil or other materials from soaking into or staining the concrete, which surface of whatever type or treatment the garage door bottom seal W is to seal against to prevent water, air, debris, etc. from entering the garage beneath the door G.

To address the problem of the gap between the overhead garage door and the floor, once again, there is typically installed along the bottom edge of the lowest section of the door a rubber sealing member configured in size and shape to meet and seal against the floor and thus close the gap between the door and the floor when the door is in the closed position. The most common configuration is a somewhat U-shaped rubber extrusion with opposite horizontal lengthwise flanges at the tops of the legs of the "U" configured to slidably engage similarly-shaped lengthwise channels formed along the bottom edge of the bottom garage door section. Of course, other means of forming and affixing such rubber bottom seals, including screw-type fasteners and adhesives, are also employed. Challenges regarding such bottom seal members in both original configuration and over time as such rubbers may become brittle or less resilient relate to effectively sealing along or across the full width of the garage door opening, which may be slightly sloped, uneven, or irregular, as having "high spots" or "low spots," or at times there may even be small objects or debris on the floor just beneath the door, any of which causing separation between the sealing member and the floor and thus allowing water, air, debris, etc. to enter the garage even with the overhead garage door down and in the closed position.

Various solutions or improvements to such overhead garage door bottom or floor seals have been proposed over the years in the interest of rendering such bottom seals more reliable and longer-lasting, starting with efforts to optimize the geometry and material resiliency, though any of which still having limitations in cost and/or functionality or ultimately not being able to successfully and fully seal across a range of floor irregularities. Some proposed configurations of such garage door bottom seals then have even involved an inflatable tube in an attempt to provide the needed resiliency and accommodation for floor irregularities, but such devices do not go far enough as being single lengthwise chambers that do not perform satisfactorily and/or cannot be justified for the additional cost and so have not gained any real industry acceptance.

Turning to FIGS. 2A-2C, there are shown enlarged partial perspective views of a bottom corner or end of various exemplary bottom seals W installed on the bottom edge or rail R of the garage door G, or specifically its lowest section, as are currently known in the art, to whatever extent they are actually employed in the industry. First, in FIG. 2A there is shown what is believed to be the most common overhead garage door bottom seal W having a somewhat U-shaped body U extruded from rubber or vinyl with opposite horizontal lengthwise flanges V at the tops of the legs of the U-shaped body U configured to slidably engage similarly-shaped lengthwise channels C formed along the bottom rail R of the bottom garage door section. The bottom seal body U may be formed of various rubber materials having various thicknesses and durometers and may further include lengthwise outwardly projecting ribs as shown, though instead may have a smooth outer wall. Regardless, the body U may be formed, at least initially before it may become embrittled due to exposure to the elements over time, with a degree of resiliency so as to flex and somewhat conform to any surface it engages or is forced against, such that for example the bottom area of the U-shaped body U may become somewhat flat as it is in contact with the floor L (FIG. 1). Depending on a number of factors including the configuration (size and shape) and material of the bottom seal W, the gap between the garage door G and the floor L when the door G is in its closed position, and the characteristics of the surface of the floor L, such bottom seal W may or may not seal effectively against the floor L, at least along the entire length of the garage door G and over time. In an attempt to solve for such issues, once again, other configurations of the bottom seal W have been proposed over the years. By way of further example, FIG. 2B shows an alternative known configuration of the bottom seal W having a somewhat annular central portion X integral with the outer U-shaped body U such as through a common or single extrusion so as to provide relatively greater vertical stiffness to the bottom seal W, particularly when the seal W is compressed to the point of there being contact of the central portion X against the bottom side of the rail R, or essentially when the gap between the garage door G, and specifically the rail R, and the floor L when the door G is in the closed position is the same or less than the diameter or vertical height of the bottom seal central portion X. Even so, such alternative bottom seal 20) W suffers from the same challenges and shortcomings as the traditional U-shaped bottom seal W of FIG. 2A, particularly over time and over irregular or sloped floor L surfaces. And in FIG. 2C there is shown yet another alternative exemplary bottom seal W again having a U-shaped body U as in FIG. 2A here with an elongate inflatable tube Y positioned within the bottom seal W or placed between the U-shaped body U and the garage door bottom rail R. As shown, the tube Y may be nominally flat but may expand to a more annular shape or otherwise occupy a portion of the space within the bottom weather seal W between the body U and the rail R. Such tube Y is configured with an actuatable one-way or self-sealing valve Z such as what is commonly referred to as a Schrader valve as also shown, which valve Z extends axially outwardly from one end of the tube Y. While employing air to pressurize and improve the sealing of the bottom seal W may generally be effective, such a 30 single lengthwise tube Y also has a number of shortcomings related to not being as robust or adaptable in use.

By way of further example, in Canadian patent application Publication No. CA2376498 by Tim Batters dated Sep. 14, 2003, there is disclosed a sealing member provided for use on an overhead sliding garage door having a track supported along a bottom side of the door and an elongate resilient member having sides received in the track so as to have a generally U-shaped cross section, the sealing member further comprising an elongate tube sealed at respective ends thereof for maintaining the tube under pressure, the tube being suitably sized for being received within the U-shaped cross-section of the resilient member of the door and for extending the full length of the door. A valve is coupled to the tube for selectively feeding or releasing air under pressure into or from the tube. The inflatable seal conforms to varying ground contours when supported on the bottom of an overhead sliding door for sealing the door with respect to the ground when the door is closed.

A similar inflatable inner tube for a garage door bottom weather seal was proposed even earlier in French Patent No. 1,391,923 dated Mar. 12, 1965, also involving a bicycle tube-type inflation valve oriented perpendicular to the lengthwise axis of the elongate tube and so intersecting a side wall of the inner tube and weather seal as in the noted Batters Canadian patent application. More recently, another version of such an inner tube for a garage door bottom weather seal was proposed and at one time sold as having the bicycle tube-type inflation valve oriented axially or along the lengthwise axis of the elongate tube, which is a discontinued product having again not gained industry acceptance.

Accordingly, such earlier approaches to garage door bottom weather seals as even involving interior inflatable tubes are lacking primarily insofar as a single lengthwise tube is found to be inadequate for sealing effectively over sloped, uneven, or irregular floors having "high spots" or "low spots" or at times even small objects or debris on the floor just beneath the door.

And to address the problem of the gap between the overhead garage door perimeter and the door frame opening, various solutions have been proposed over the years essentially relating to a trim seal or weather seal or weatherstripping material that may be installed along the door frame, or jambs and header, positioned so as to contact and seal against the outer surface or face of the garage door when in the closed position within or adjacent to the opening. Such trim pieces typically involve an elongate somewhat rectangular cross-section or profile body having an elongate flexible flap extending at an angle along one edge or surface of the trim piece body, such as shown in U.S. Pat. Nos. 6,167,657 and 6,360,489 to Burge et al. When the trim piece body is affixed to the door frame as by being cut into pieces of the appropriate length and nailed or screwed to the jambs and header, the flexible flap is oriented inwardly so as to make contact with the face of the garage door perimeter when the door is closed. While such conventional door trim seal generally resists air flow around the door and thus prevents some of the adverse effects of air, water, light, and dirt and debris passing around the door and into the garage, it also has drawbacks in performance primarily related to its tendency to bow or separate from the door frame due to improper installation or weather and thermal effects over time. If this is not addressed as is often the case, then the door trim seal is only performing marginally, as the interior of the garage is yet able to be compromised by air, water, light, and debris from outside the structure that can still pass into the garage behind the trim seal, or again between the trim seal and the door frame, with attendant thermal inefficiencies remaining. Alternatively, an additional installation step of caulking the front edge of the door trim seal has been employed in an effort to seal any gap that may exist or form between the inside surface of the trim piece and the door frame or jamb or header, but the 20) additional caulking step comes at additional labor and material cost and also makes removal and replacement of the door trim pieces more difficult, disadvantageously often requiring resurfacing and repainting of the surrounding door frame as well.

In an effort to improve on the basic door trim seal as described above, other solutions have been proposed more recently. Most such alternative door trim seal systems are relatively complex multi-part systems such as involving both an interior door jamb trim and an exterior door jamb trim that together form an adjustable mating configuration that seals the interface between the two trims to account for various door frame widths or gap widths between the door and frame as shown in U.S. Pat. No. 9,068,391 to Peck et al. or as having a base trim piece through which fasteners are installed into the door frame and a trim piece cap that then goes over the trim piece base to conceal the fastener heads, such as shown in U.S. Pat. No. 6,772,560 to Dischiant et al., U.S. Pat. No. 9,045,937 to Peck et al., and U.S. Pat. No. 9,845,638 to Cunningham, which by having effectively double the amount of trim piece material for the perimeter of the door and door frame than would otherwise be required essentially results in about double the cost, which along with additional installation steps being required renders such alternative door trim seal systems also disadvantageous.

Of the above-noted alternative door trim seal systems, only the Cunningham system of U.S. Pat. No. 9,845,638 also addressed the issue of sealing the front edge of the trim strip, or the edge opposite the garage door, so as to prevent or mitigate against a gap being formed between the inside surface of the trim strip and the door frame, or jamb or header, and the garage interior thus being breached, but such jamb seal edge is formed on the outer Cunningham trim strip that then must be snapped into a trim strip base installed along the door jamb, thus again effectively doubling the cost of the Cunningham system. Moreover, by design, the jamb seal edge extends from the outer surface of the outer snap-in trim strip just as the opposite door seal edge, resulting in further material cost by having a relatively greater width of the front jamb seal edge. Accordingly, the Cunningham system has several drawbacks in configuration and cost and so is a less than ideal solution.

There has also been proposed in U.S. Pat. No. 9,745,798 to Preising, Jr. et al., assigned to Overhead Door Corporation, an overhead door trim seal system entitled "Movable Barrier Seal Assembly" that involves an elongate base member having first and second sealing members extending from the base member for sealing engagement with the door. The first sealing member is the flexible flap type as is known so as to extend from the rear of the trim piece at an angle toward and able to contact and seal against a closed door, while the second sealing member is a deformable bulb-profile material also positioned at the rear edge of the trim piece adjacent to the first sealing member and so oriented toward and able to also contact and seal against the closed door, thereby effectively doubling the seal between the trim piece and the door, with the bulb-like second sealing member bowing outwardly when compressed by the door so as to contact the door frame and thus simultaneously provide resistance to movement of the door relative to door frame and some degree of seal laterally against the door frame at the back of the trim piece. However, this design also has a number of disadvantages in terms of cost and complexity as a multi-part configuration but also in terms of not sealing effectively against the door frame and not at all at the front or outer edge of the trim strip, which can thus still allow air and water to get behind the trim piece, or between the trim piece and the door frame, and so lead to issues whether or not also bypassing the bulb-like second seal member and into the garage.

Finally, in Applicant's co-pending and commonly-owned U.S. patent application Ser. No. 18/222,810 filed Jul. 17, 2023 and entitled "Overhead Garage Door Trim Seal Apparatus and Method of Installation and Use," there has been proposed, among other things, installation within one of the grooves of the inwardly-facing ribbed surface of the trim piece a backer rod or an integral rib flap or rib loop as by co-extrusion as a means for sealing between the trim piece and the door frame, alone or in combination with other sealing means.

What has been needed and heretofore unavailable is an improved seal apparatus for effectively sealing about the perimeter of a garage door when closed, particularly against the floor or against the door frame defining the garage door opening. Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing a new and novel inflatable seal apparatus. In at least one embodiment, an inflatable seal apparatus according to aspects of the present invention for selectively sealing a garage door opening comprises a plurality of inflatable members arranged with a seal body configured for selectively sealing the garage door opening, each inflatable member having one or more of an inflatable member side wall and an inflatable member end wall and having an inflation valve operably installed within the inflatable member side wall or the inflatable member end wall so as to be accessible through the seal body.

Other objects, features, and advantages of aspects of the present invention will become more apparent from the following detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

Figure 1:
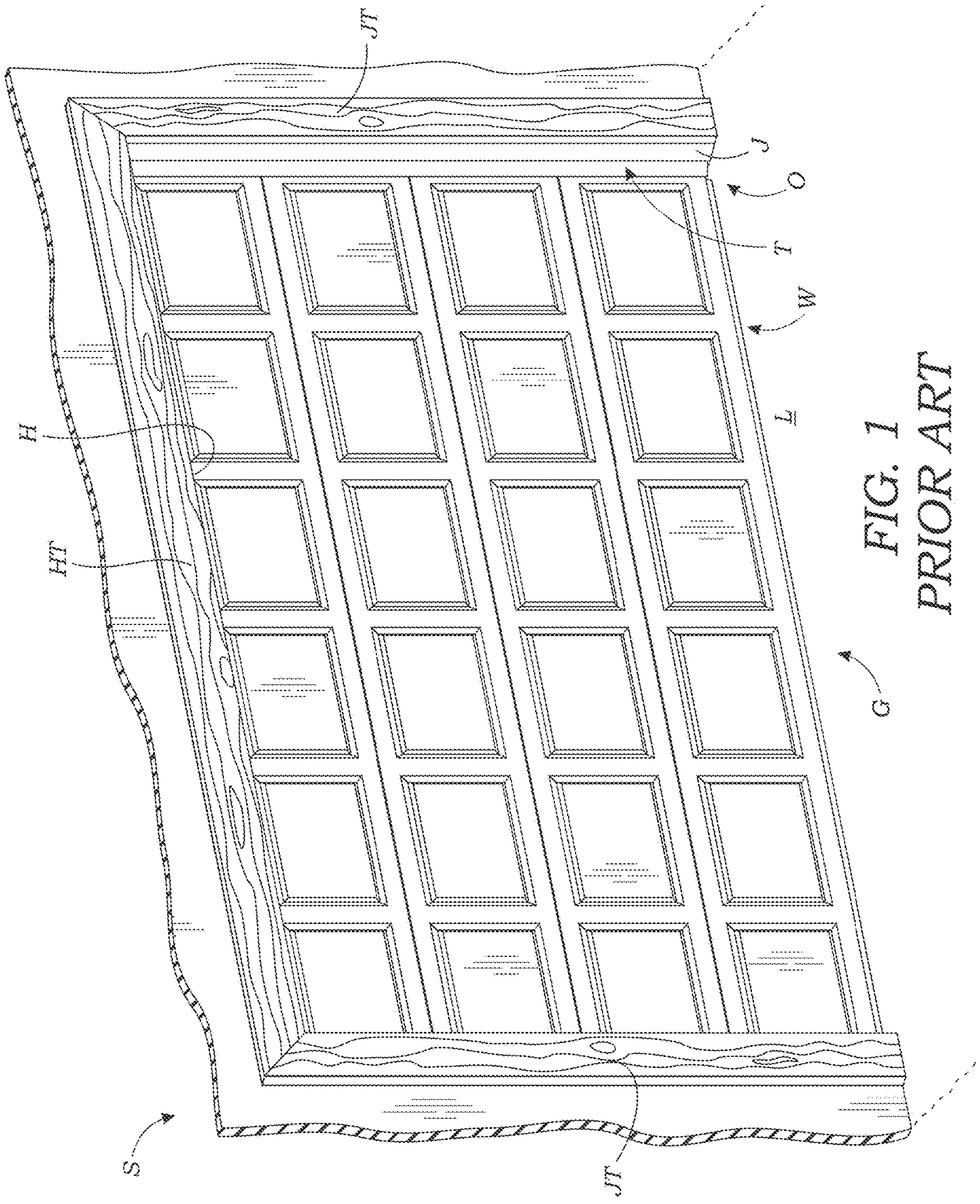
FIG. 1 PRIOR ART
FIG. 1 is a perspective view of an exemplary prior art overhead garage door as installed and in a closed position within a garage door opening within a structure.
Figure 2A:
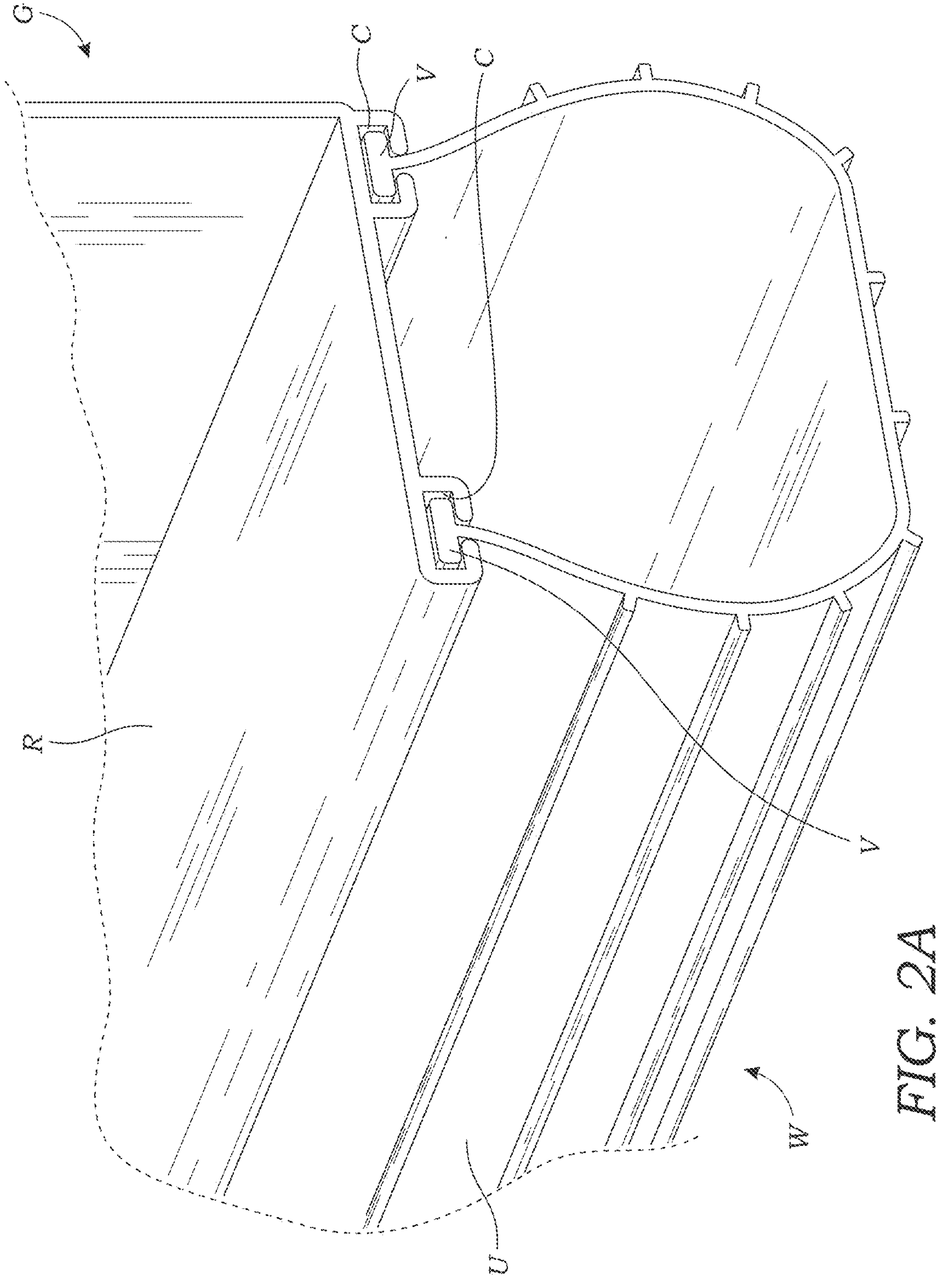
FIG. 2A PRIOR ART
FIG. 2A is an enlarged partial perspective view thereof showing a bottom corner of the overhead garage door as including a first exemplary prior art weather seal.
Figure 2B:
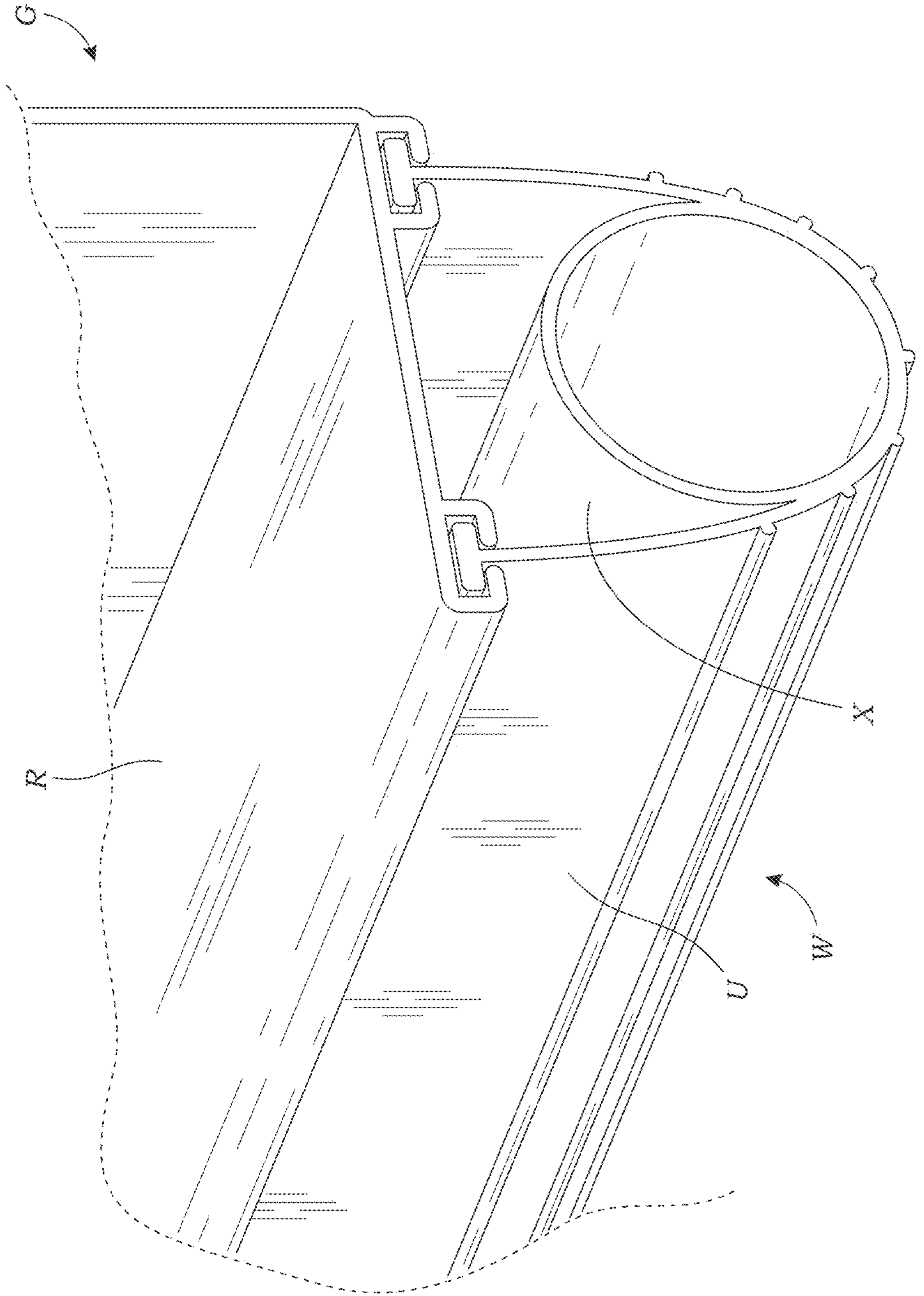
FIG. 2B PRIOR ART
FIG. 2B is an enlarged partial perspective view thereof showing a bottom corner of the overhead garage door as including a second exemplary prior art weather seal.
Figure 2C:
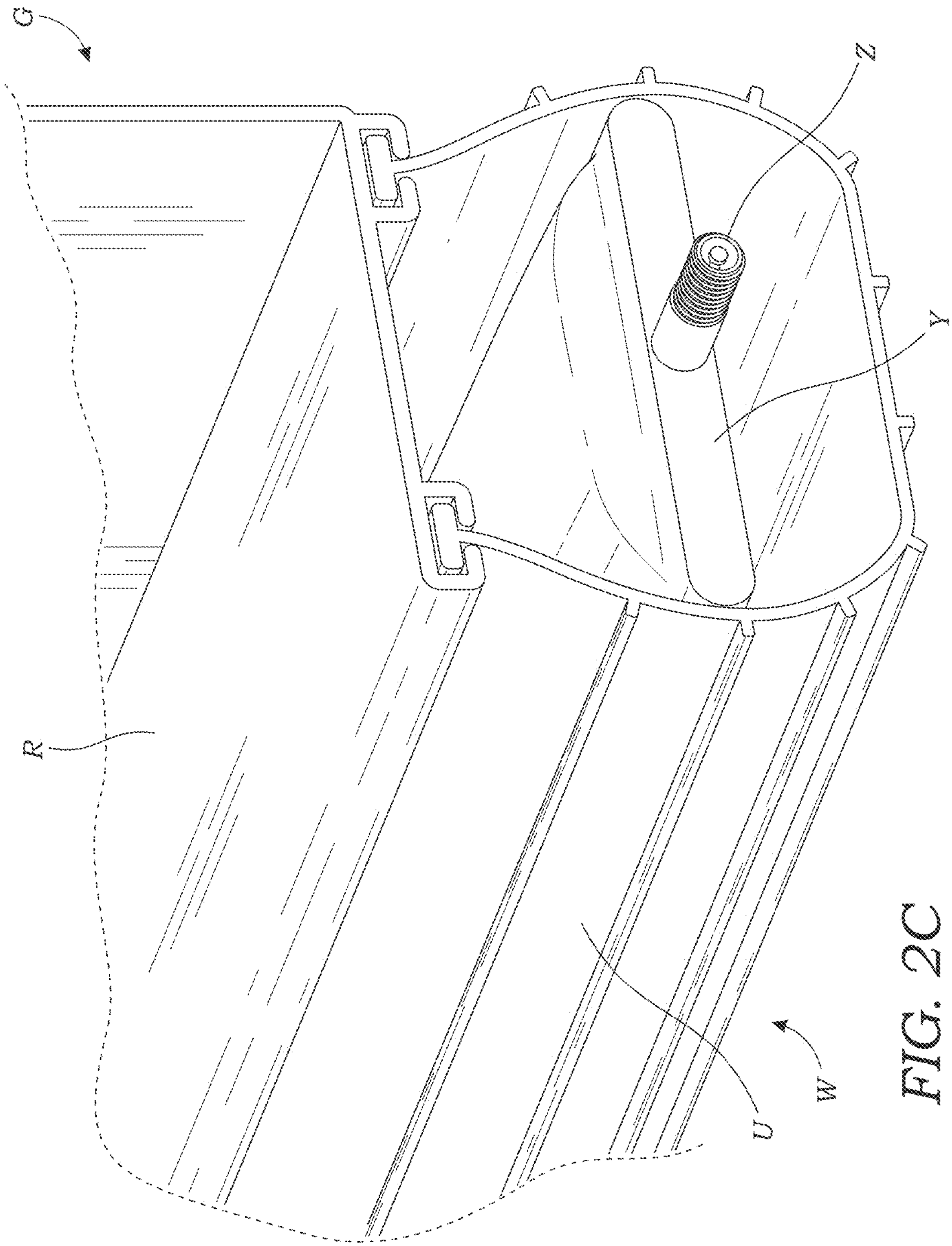
FIG. 2C PRIOR ART
FIG. 2C is an enlarged partial perspective view thereof showing a bottom corner of the overhead garage door as including a third exemplary prior art weather seal.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments. More generally, those skilled in the art will appreciate that the drawings are schematic in nature and are not to be taken literally or to scale in terms of material configurations, sizes, thicknesses, and other attributes of an apparatus according to aspects of the present invention unless specifically set forth herein.

DETAILED DESCRIPTION

The following discussion provides many exemplary embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

While the inventive subject matter is susceptible of various modifications and alternative embodiments, certain illustrated embodiments thereof are shown in the drawings and will be described below in detail. It should be understood, however, that there is no intention to limit the invention to any specific form disclosed, but on the contrary, the inventive subject matter is to cover all modifications, alternative embodiments, and equivalents falling within the scope of the claims.

Figure 3:
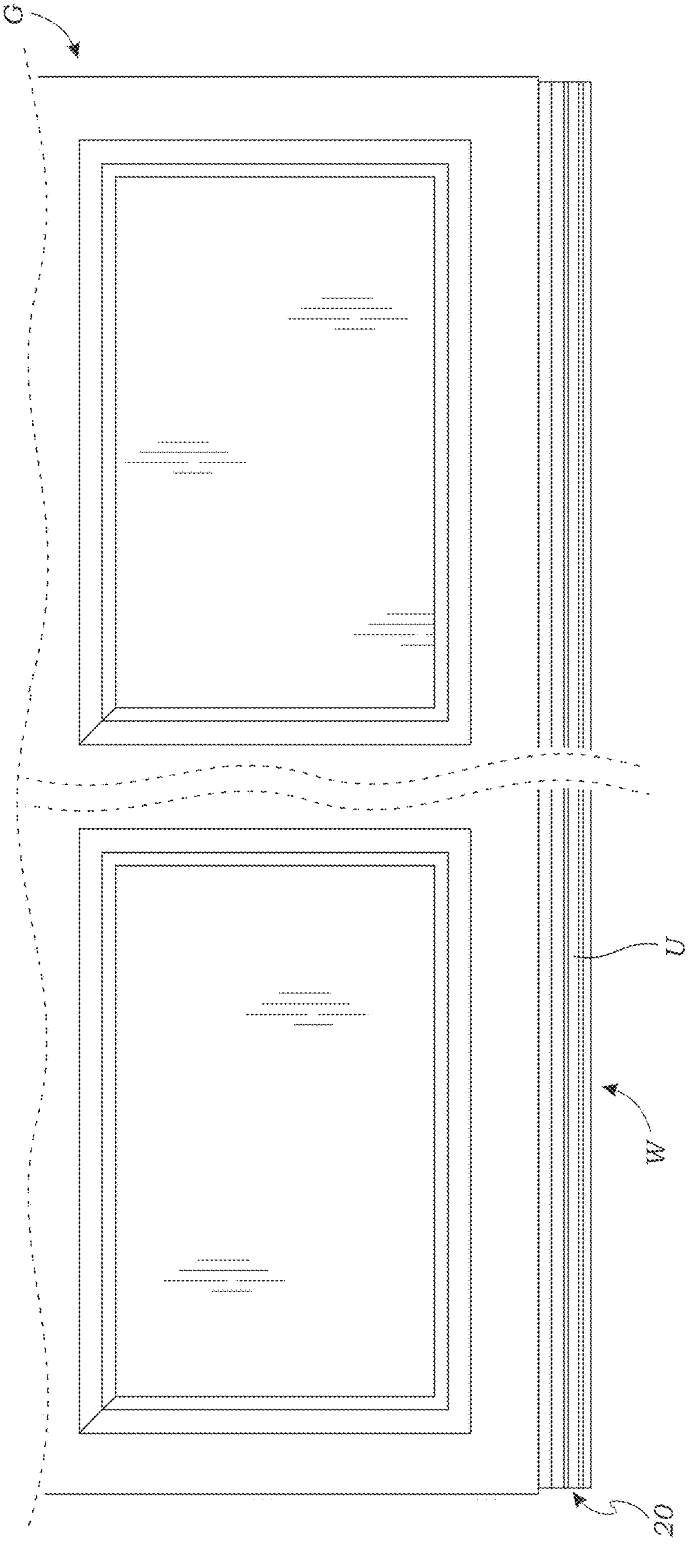
FIG. 3 is a partial front view of an overhead garage door having a first exemplary inflatable seal apparatus, in accordance with at least one embodiment.
Figure 4:
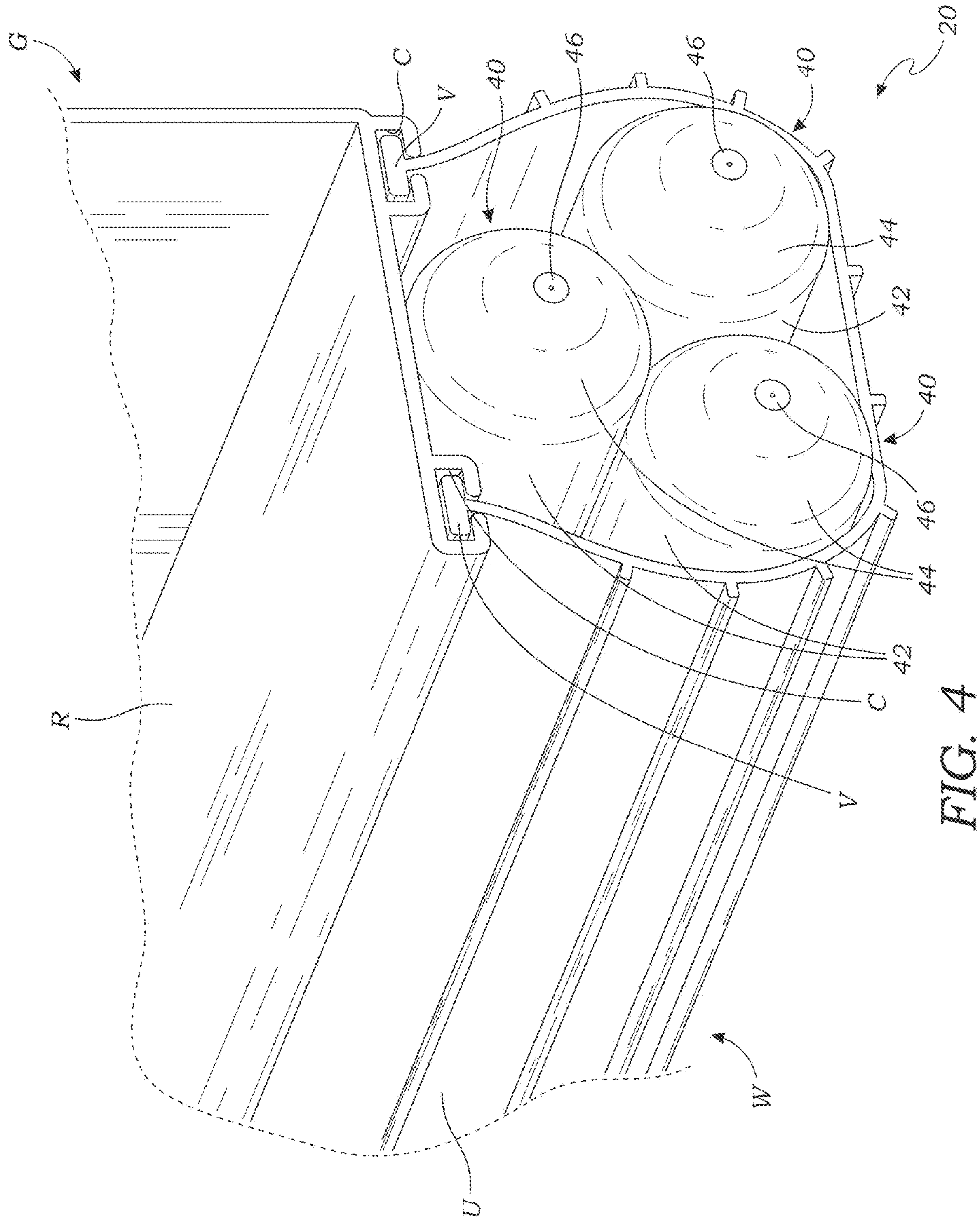
FIG. 4 is an enlarged partial perspective view thereof showing an open end of the first exemplary inflatable seal apparatus, in accordance with at least one embodiment.
Figure 5:
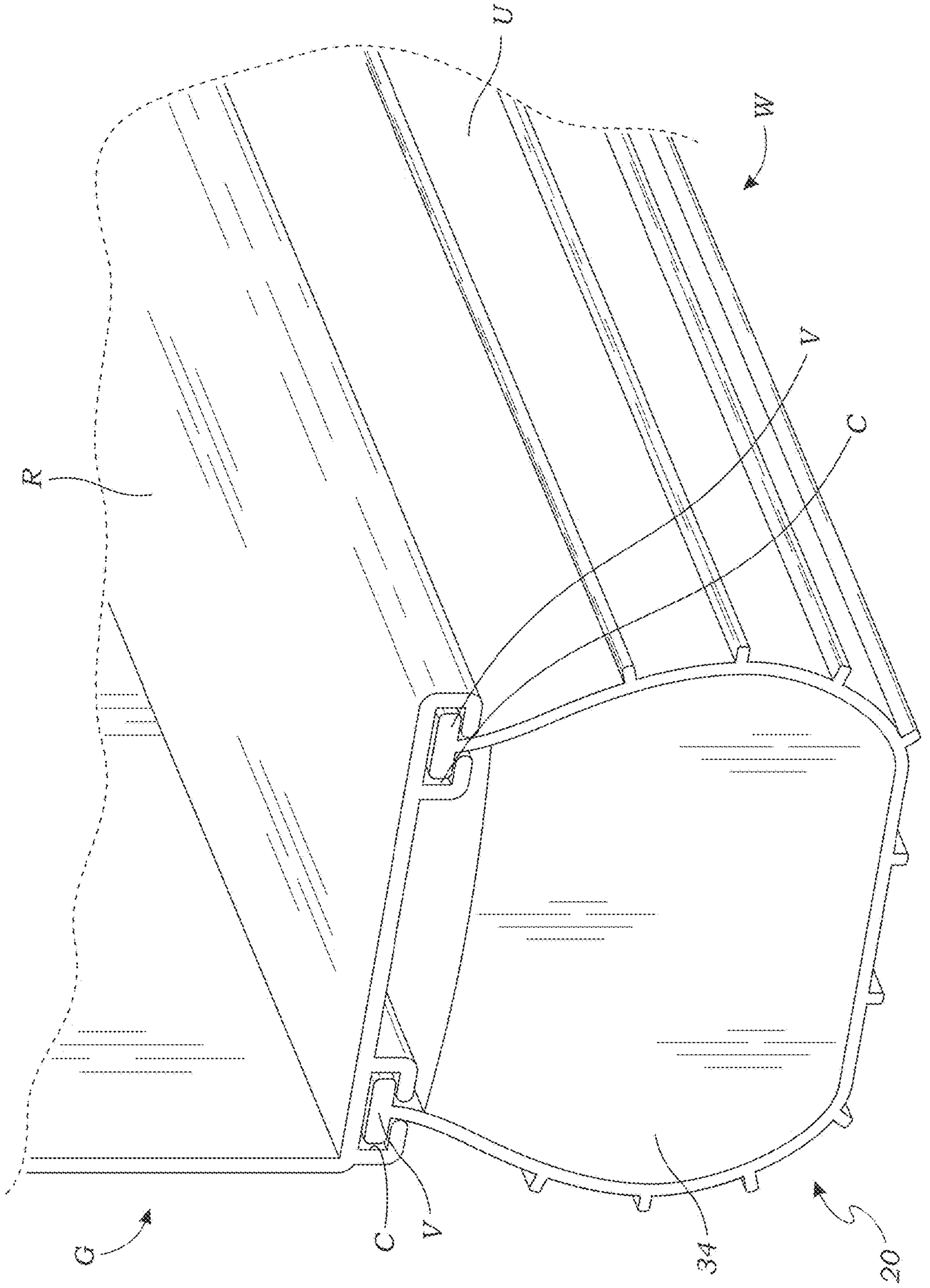
FIG. 5 is an enlarged partial perspective view thereof showing an opposite closed end of the first exemplary inflatable seal apparatus, in accordance with at least one embodiment.
Figure 6:
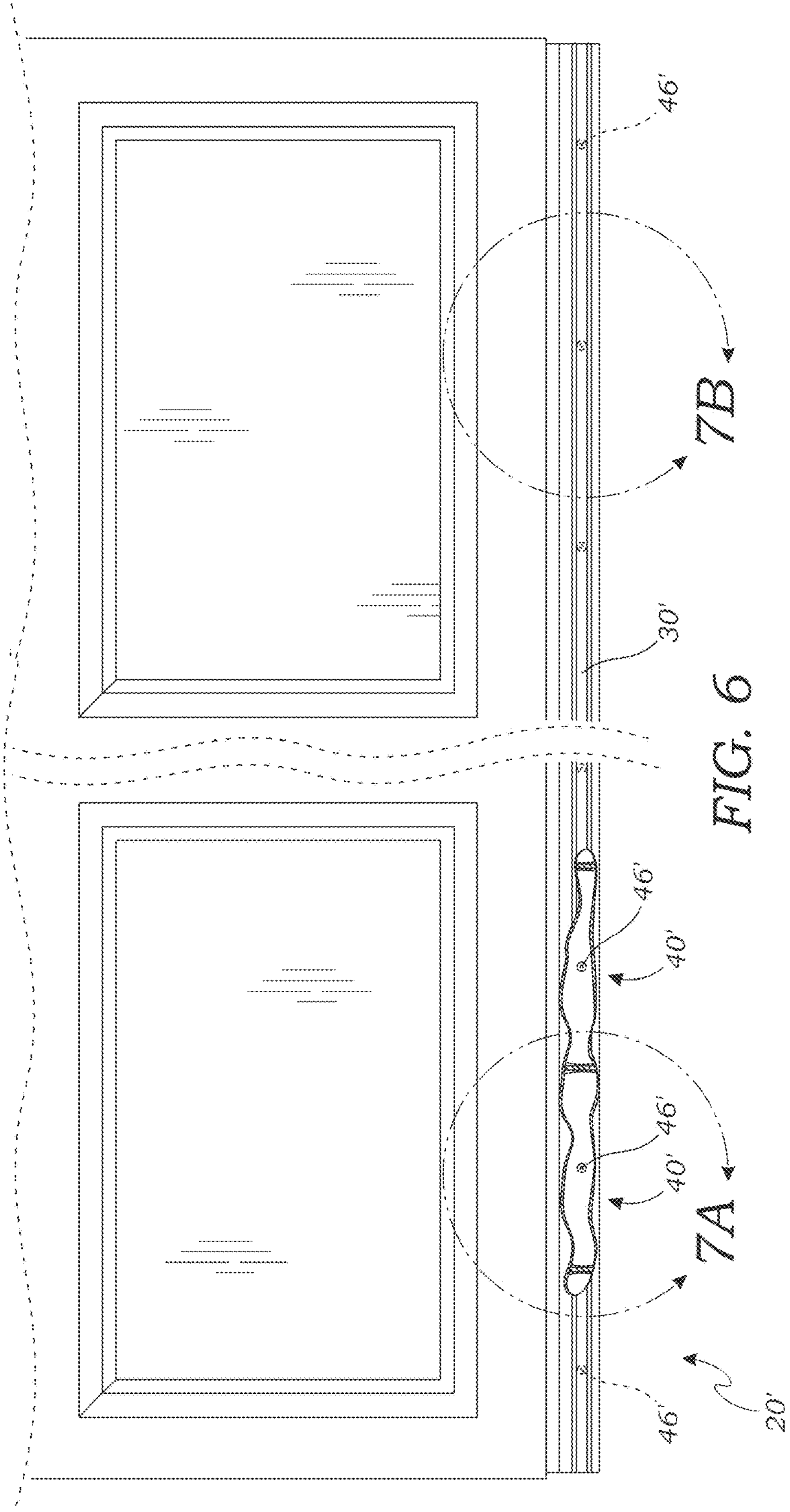
FIG. 6 is a partial front view of an overhead garage door having a second exemplary inflatable seal apparatus, in accordance with at least one embodiment.
Figure 7A:
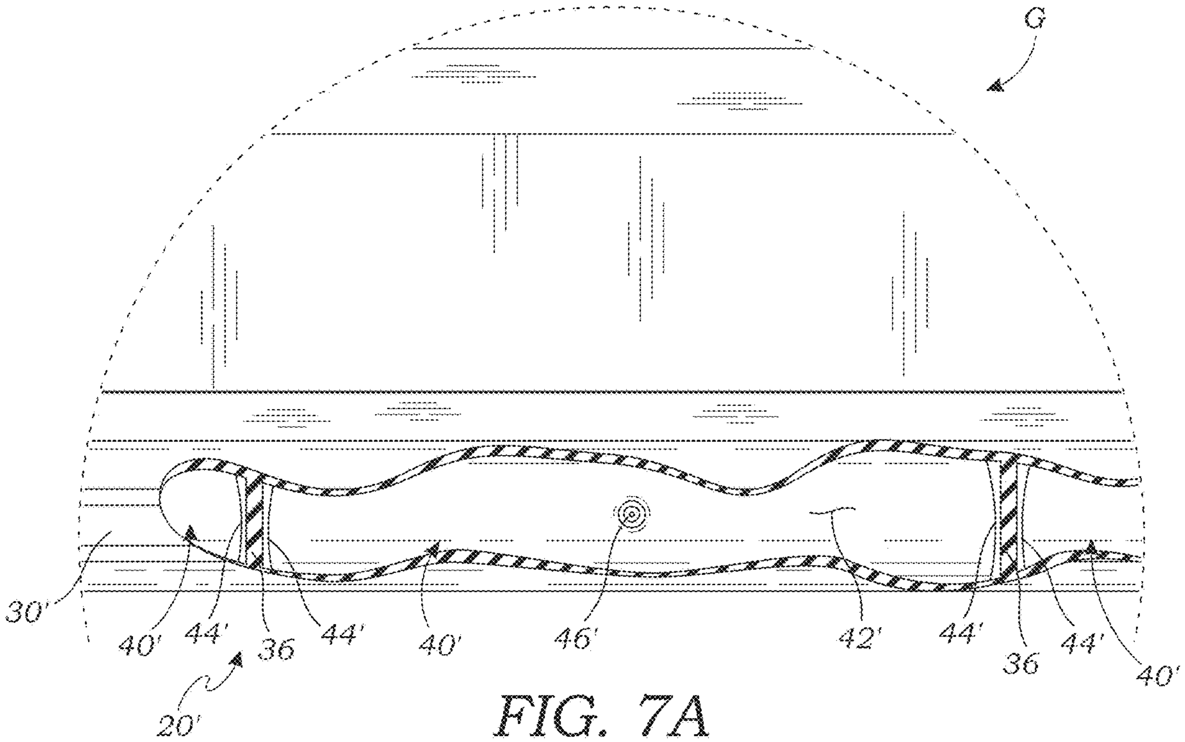
FIG. 7A is an enlarged partial cut-away front view thereof taken from circle 7A in FIG. 6, in accordance with at least one embodiment.
Figure 7B:
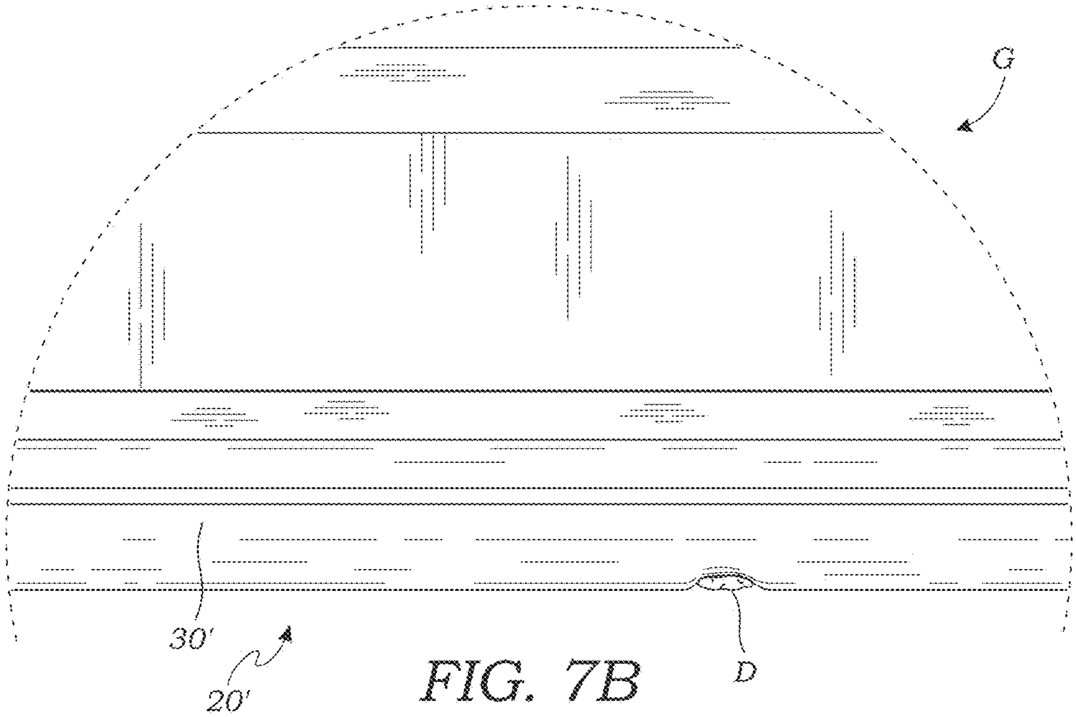
FIG. 7B is an enlarged partial front view thereof taken from circle 7B in FIG. 6 and now showing an object beneath the inflatable seal apparatus, in accordance with at least one embodiment.
Figure 8:
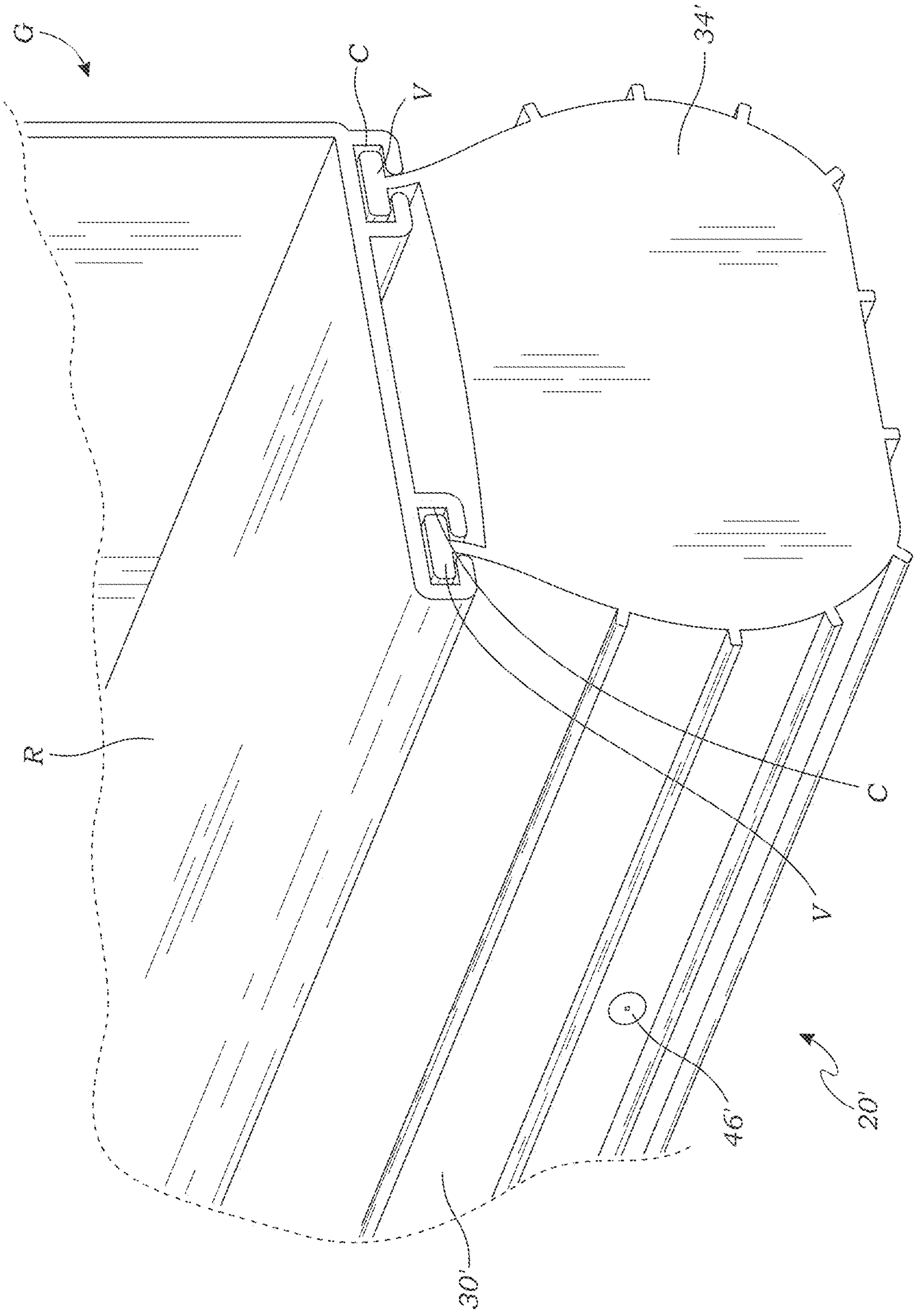
FIG. 8 is an enlarged partial perspective view thereof showing a first closed end of the second exemplary inflatable seal apparatus, in accordance with at least one embodiment.
Figure 9:
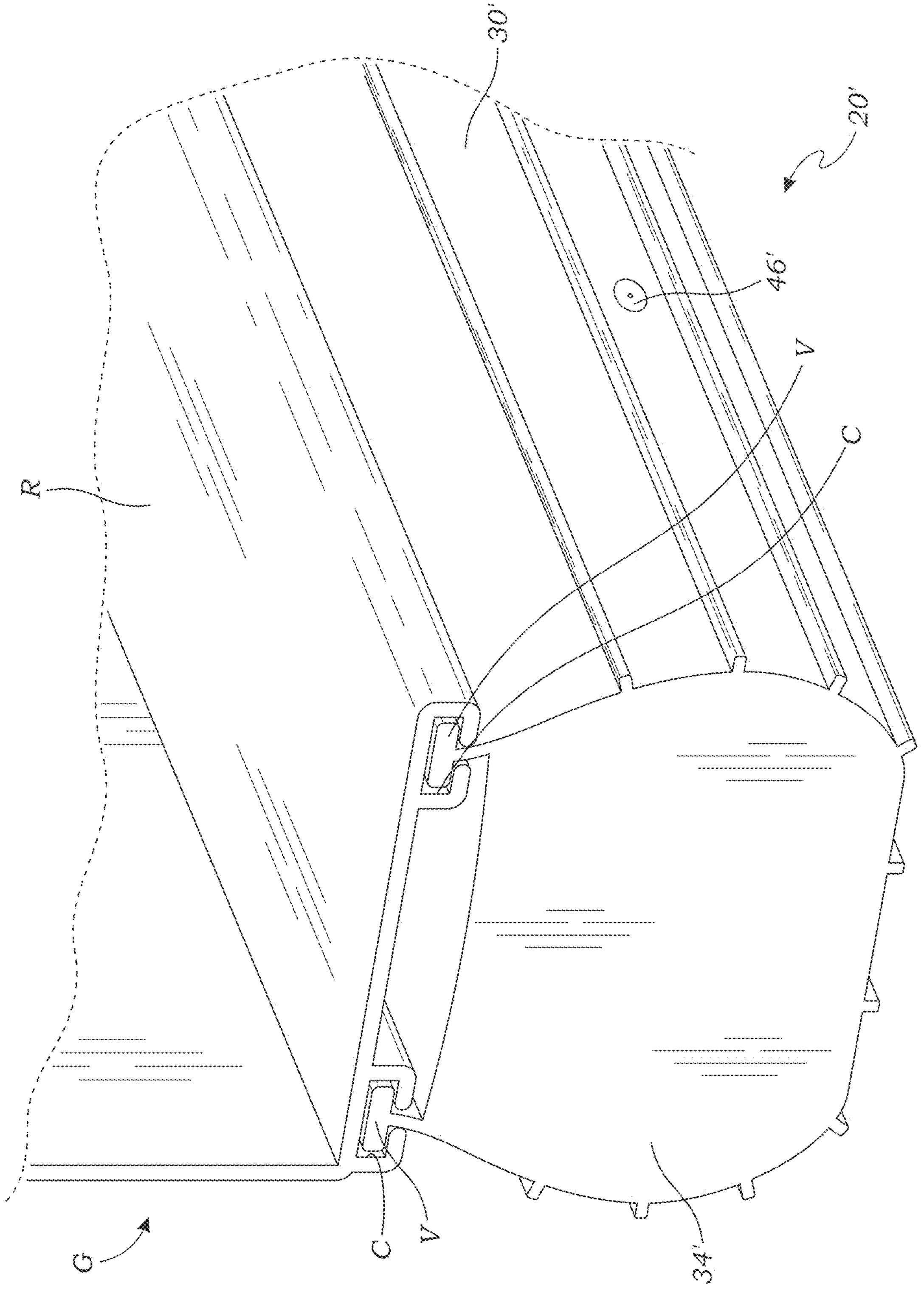
FIG. 9 is an enlarged partial perspective view thereof showing an opposite second closed end of the second exemplary inflatable seal apparatus, in accordance with at least one embodiment.
Figure 10:
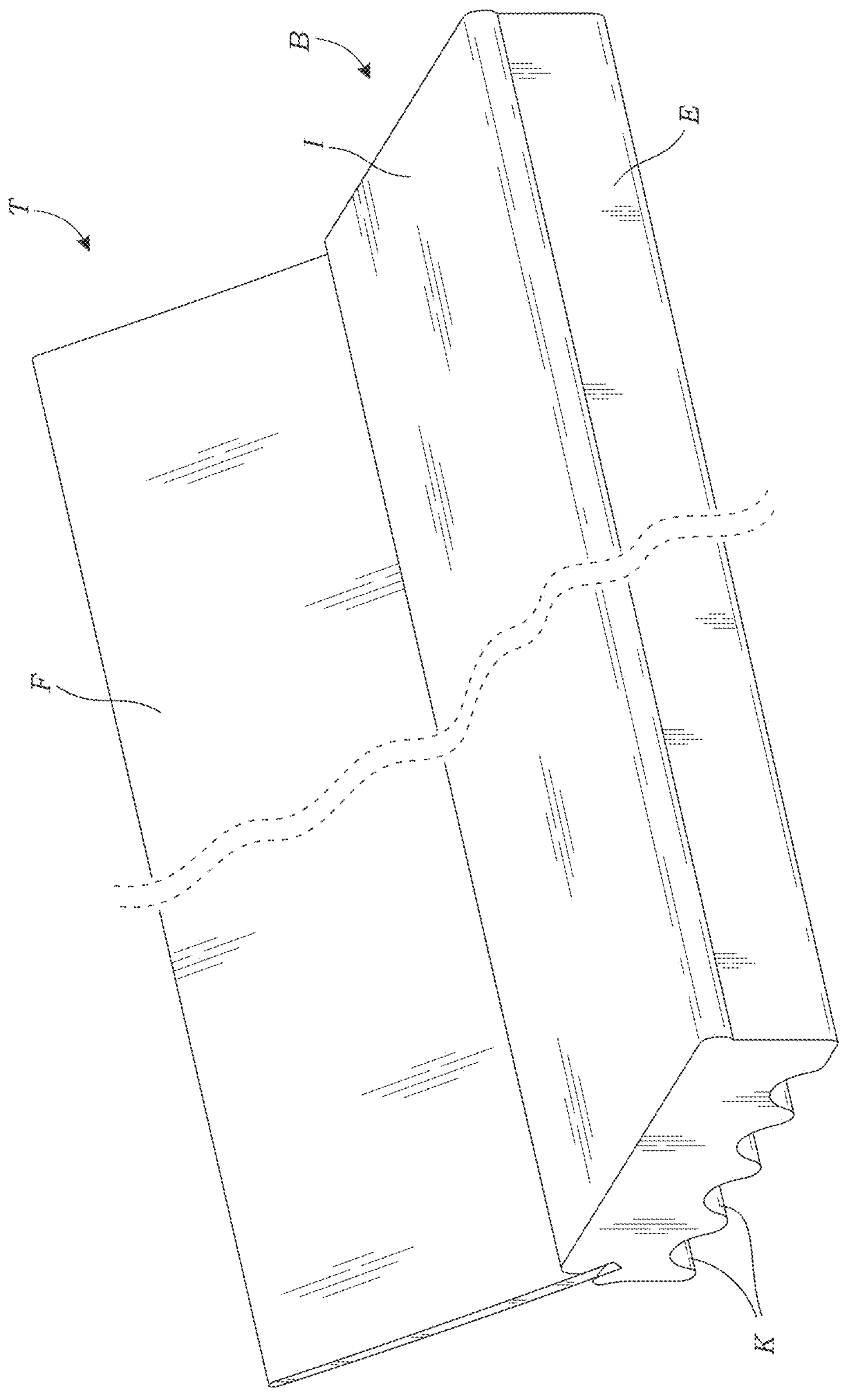
FIG. 10 PRIOR ART
FIG. 10 is a partial perspective view of a prior art trim seal.
Figure 11:
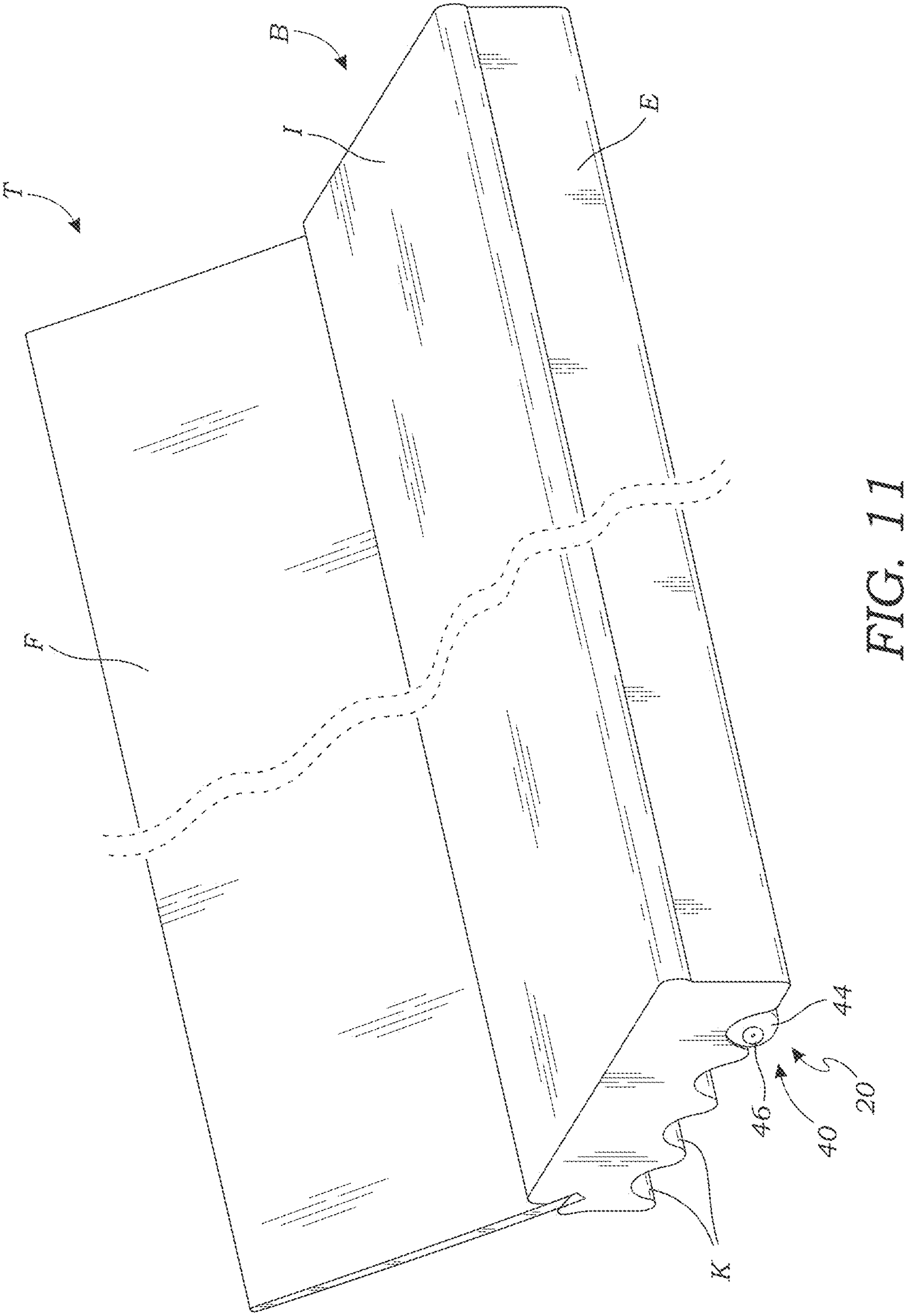
FIG. 11 is a partial perspective view of the prior art trim seal of FIG. 10 having installed therewith a third exemplary inflatable seal apparatus, in accordance with at least one embodiment.
Figure 12:
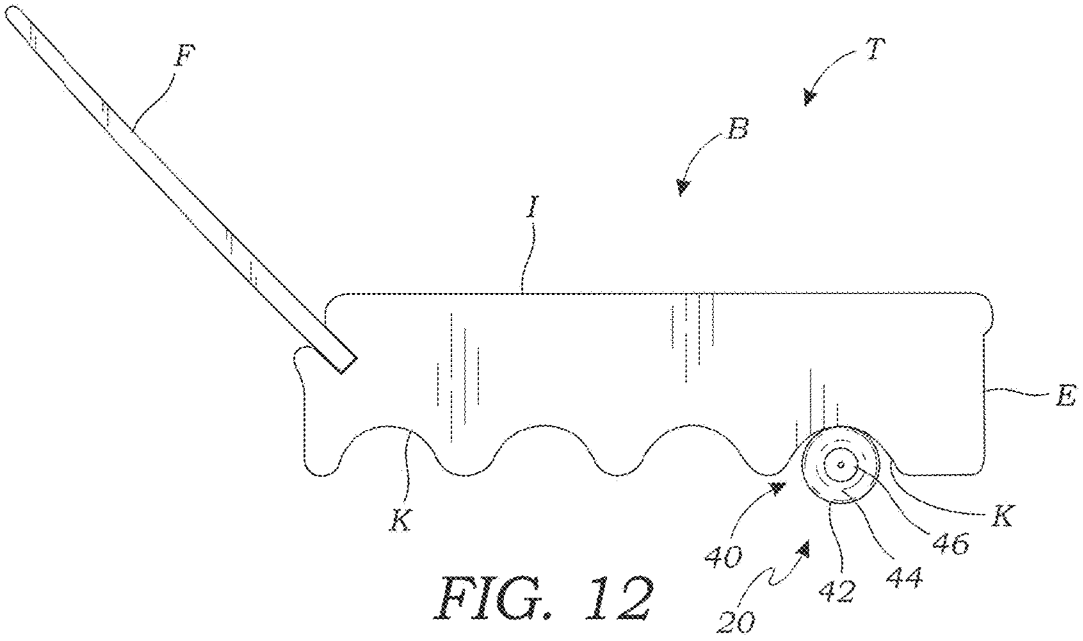
FIG. 12 is an end view thereof, in accordance with at least one embodiment.

Referring now to FIGS. 3-5, there is shown a first exemplary inflatable seal apparatus 20 according to aspects of the present invention configured as a bundle or plurality of substantially parallel lengthwise inflatable members 40 positioned within an otherwise conventional bottom seal W installed along the bottom of a typical garage door G again having a bottom section rail R with spaced-apart downwardly-opening channels C in which the flanges V of the U-shaped body U of the bottom seal W slidably engage to secure the bottom seal W along the bottom of the door G. Each such inflatable member 40 is configured having an elongate somewhat annular side wall 42 and a corresponding somewhat flat or semi-spherical circular-profile end wall 44 in which is operably installed a valve 46 for selective inflation or deflation of each inflatable member 40, here preferably and advantageously configured as a rubber check valve that allows for inflation and deflation as with sports balls and the like using a hollow needle and pump, insertion of the needle opening the valve 46 and allowing air flow, which it will be appreciated is a known and effective and inexpensive seal and unlike bicycle tube-type valves has a low profile and so is substantially flush with the end wall 44 of each inflatable member 40 and thereby does not extend beyond the lateral margins of the bottom seal body U to thus prevent unwanted contact or damage to the valve 46 from the garage door mechanism, such as the adjacent tracks (not shown), or other objects. Even so, those skilled in the art will appreciate that other valves now known or later developed may be employed in an inflatable seal apparatus 20 and specifically any such inflatable member 40 thereof without departing from the spirit and scope of the invention. While a generally conventional bottom seal W with U-shaped body U is thus shown as employed in connection with the first exemplary embodiment of the inflatable seal apparatus 20, it will be appreciated that other configurations of the bottom seal W now known or later developed may be employed in combination with the inflatable seal apparatus 20 without departing from its spirit and scope. Relatedly, and by way of further illustration and not limitation, the otherwise conventional bottom seal U-shaped body U may be formed with one end open as typically as shown in FIG. 4 but with the other opposite end closed as by having an end wall 34 formed thereon, therein, or thereover as shown in FIG. 5, which end wall 34 it will be appreciated may perform or provide a sealing function, whether primarily or secondarily, but in the exemplary embodiment it is expected that each of the lengthwise inflatable members will be self-contained inflatable bodies such that the end wall 34 simply encloses that end of the bottom seal body U to secure the lengthwise inflatable members 40 therein and protect them from outside objects or other exposure. Furthermore, those skilled in the art will appreciate that the opposite end of the body U shown as open in FIG. 4 such as for access to the inflation valves 46 of each inflatable member 40 may also be closed as with an end wall 34, it being further appreciated that any such end wall 34 may be integral with the bottom seal U-shaped body U or may be selectively removable as by being press—or interference-fitted, snap-fitted, or frictionally or otherwise removably engaged with the bottom seal body U, either way such wall 34 being formed of any appropriate resilient material so as to selectively cap the end of the body U and still flex with the body U as it itself flexes as it comes into contact with the floor L (FIG. 1) when the garage door G is in the closed position. Preferably, any such end wall 34 adjacent to the valved end of the inflatable members 40 will be removable for selective access to the valves 46 in order to inflate or deflate or adjust the pressure of the inflatable seal apparatus 20 during use, such as to account for a bigger or smaller gap between the garage door G and the floor L, a sloped or irregular floor L, or seasonal or specifically temperature effects on the inflatable members 40 of the apparatus 20. Those skilled in the art will appreciate that by having a plurality of inflatable members 40 the combined effect operating within the U-shaped body U is a more adaptive and dynamic inflatable seal apparatus 20 as the inflatable members cushion against themselves and against the inside perimeter of the bottom seal W defined by the U-shaped body U and the bottom door section rail R. It will also be appreciated that by having a plurality of inflatable members 40 within the inflatable seal apparatus 20 even if one failed as by having its side wall 42 or end wall 44 punctured somehow or its valve 46 leaking or failing, there would remain other operable inflatable members 40 to still provide the cushioning and sealing effect within the bottom seal W even if not as optimally. Once again, those skilled in the art will appreciate that other numbers and configurations of such inflatable members 40 beyond the three elongated annular inflatable members 40 shown are possible according to aspects of the present invention without departing from its spirit and scope.

Turning next to FIGS. 6-9, there is shown a second exemplary inflatable seal apparatus 20' according to aspects of the present invention here configured as multiple widthwise end-to-end inflatable members 40' within the garage door bottom seal U-shaped body 30', with the inflation valve 46' for each inflatable member 40' then positioned within the side wall 42' rather than the end wall 44' of each inflatable member 40' so as to also then intersect and be positioned at least partially within the U-shaped body 30' for access to each valve 46' for inflation and deflation as again by a pump needle, with each such valve 46' thus being flush with or recessed relative to the bottom seal body 30' so as to again minimize any risk of being struck or damaged. It is noted that both for aesthetic reasons and to reduce exposure of the valves 46' to the elements outside the garage or at the exterior of the garage door G, the valves 46' are positioned on the side of the body 30' oriented interiorly or toward the garage structure S (FIG. 1), such that in the front view of FIG. 6, the backs of the valves 46' are visible in the cut-away region and the other valves 46' are shown in dashed lines as not being visible from the front, while in the enlarged partial perspective views of FIGS. 8 and 9 the inflatable seal apparatus 20' and body 30' is viewed from the back side where the valves 46' are positioned. It will also be appreciated that with the valves 46' advantageously positioned on the interior side of the bottom seal body 30', when the garage door G is in the fully up or overhead position, the valves 46' would be oriented somewhat downwardly and so still be accessible. As best seen in FIG. 7A, each inflatable member 40' positioned within the bottom seal body 30' is again in a widthwise or end-to-end arrangement relative to the body 30' and any adjacent inflatable member(s) 40', and in the exemplary embodiment a lateral or cross-wise intermediate wall 36 of the body 30' separates the inflatable members 40'. While each such intermediate wall 36 is shown as being integral with the bottom seal body 30', such may instead be formed separately and installed within the body 30' employing any appropriate technique now known or later developed, including but not limited to bonding and ultrasonic welding. In any case, it will be appreciated that such spaced-apart intermediate walls 36 in cooperation with opposite end walls 34' of the body 30' (FIGS. 8 and 9) not only physically contain and isolate each inflatable member 40' within the bottom seal body 30' but also provide a further sealing effect for each inflatable member 40'. When each inflatable member 40' has its own side and end walls 42', 44' and so is a self-contained inflationary device, it will be appreciated that the body 30' and its end and intermediate walls 34', 36 again serve a physical containment and protection function and effectively a secondary sealing function. But it will also be appreciated that in such configuration of the self-contained inflatable members 40' particularly the intermediate walls 36 of the body 30' may not be employed and the members 40' just contained within the bottom seal body 30' in an end-to-end arrangement but not otherwise isolated from each other. Conversely, the side and end walls 42', 44' of the inflatable members 40' may not be separately formed but may instead be common or integral with the bottom seal body 30' and its end and intermediate walls 34', 36, or some combination thereof. Accordingly, those skilled in the art will appreciate that while a particular configuration of the alternate inflatable seal apparatus 20' according to aspects of the present invention is shown and described, other such configurations are possible without departing from the spirit and scope of the invention. Similarly, with reference to FIGS. 8 and 9, while the end walls 34' are here shown as being integral with the bottom seal body 30', it will be appreciated that such end walls 34' may again be formed separately and installed within the body 30' in a secondary operation or may even be removably installed as described above in connection with the first exemplary embodiment of an inflatable seal apparatus 20' according to aspects of the present invention of FIGS. 3-5. In any case, beneficially, with such inflatable members 40' again oriented widthwise along the width of the garage door G or end-to-end along the length of the bottom seal body 30', each such inflatable member 40' can thus be separately inflated or deflated via its own valve 46' as appropriate such as to account for high or low spots along the floor L and thus inconsistent spacing or gap between the garage door G and its bottom section rail R specifically and the floor L when the door G is fully lowered. And as shown in FIG. 7B, even were there some foreign object or debris D on the floor L immediately beneath the garage door G and thus the inflatable seal apparatus 20', the particular inflatable member 40' adjacent to or over the object D would be able to compress or flex about the object D while all other separate and isolated inflatable members 40' would be unaffected in still themselves contributing to a complete seal against the floor L adjacent their respective locations, thereby minimizing any compromise of the bottom seal along the entire width of the garage door G.

Figure 13:
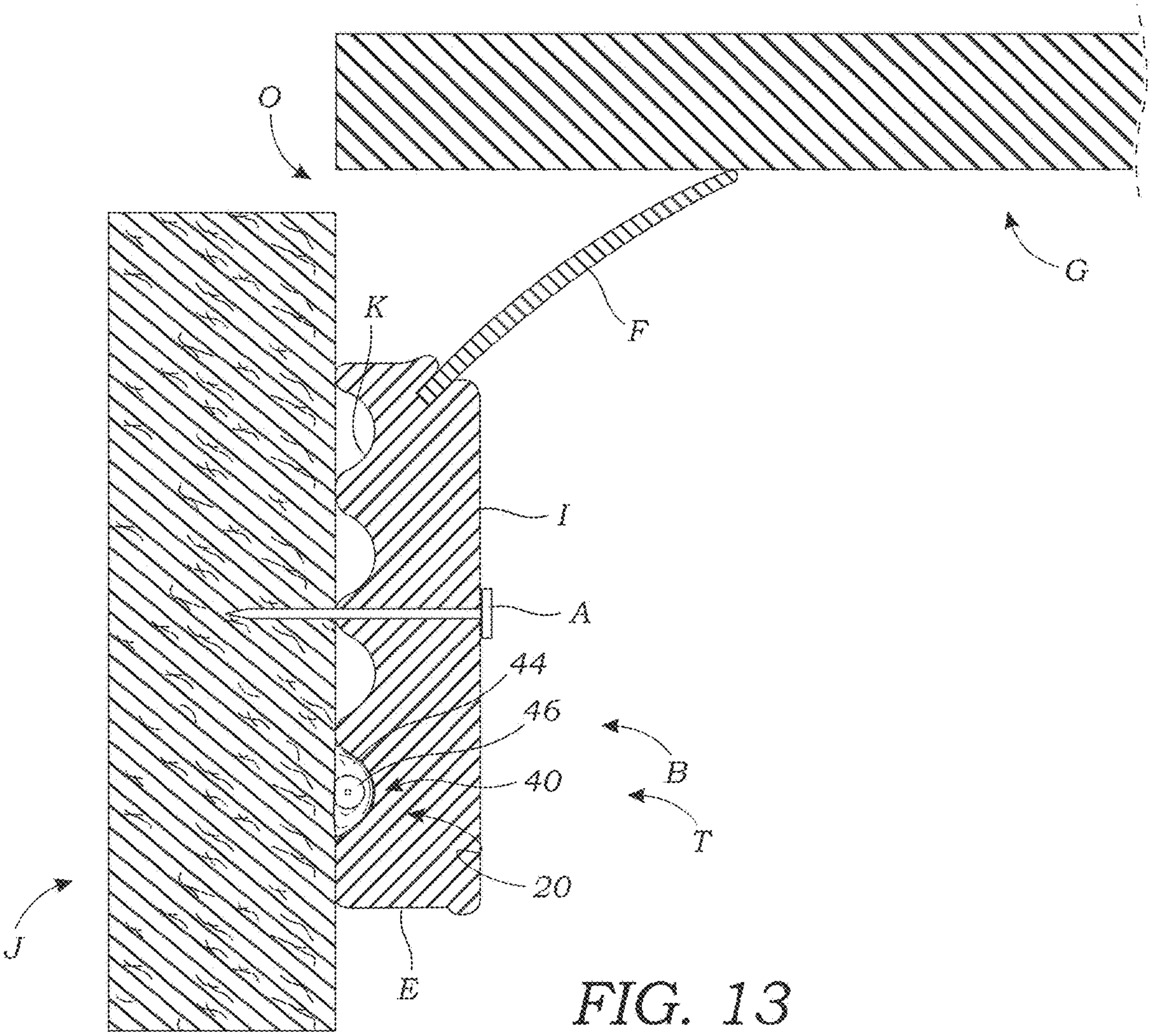
FIG. 13 is a reduced-scale cross-sectional end view thereof as installed on a door frame adjacent to an overhead garage door, in accordance with at least one embodiment.

Referring next to FIGS. 10-16 there are shown further alternative embodiments of an inflatable seal apparatus 20 according to aspects of the present invention here incorporated into or used in connection with the trim seal T that is installed on the door frame header H and jamb J of the garage opening O adjacent to the top and sides of the garage door G, rather than as or part of the bottom seal W of the garage door G along the floor L (FIG. 1) as in the exemplary embodiments of FIGS. 3-9. While the exemplary inflatable seal apparatuses 20 in such alternative trim seal T context are shown and described as being continuous along the length of the trim seal T, it will be appreciated that multi-chamber apparatuses 20 as by having multiple inflatable members 40 or having multiple isolated inflatable regions or chambers within a single inflatable member 40 are also possible according to aspects of the present invention as being incorporated into or used in connection with the trim seal T. First, as shown in FIGS. 10-13, an otherwise conventional trim piece T may be employed as having a body B with a front edge E and a rear flexible flap F, the body B having an outer face I and an opposite inner surface with grooves K, with there essentially being a variety of configurations relating to how and from where the flap F extends from the back area of the body B. Each such prior art trim seal T is effectively dual durometer material, meaning that the body B and the flexible flap F are of two different durometers commonly extruded out of a single production line or die in a manner known and practiced in the art. While such a conventional trim piece T may thus seal against the garage door G when closed via the rearwardly-extending flexible flap F, the front edge E and thus the region between the body B and the door frame is susceptible to being not completely sealed or there being a gap for air, water, light, debris, etc. to get past the trim piece body B and behind the rear flap F and thus around the garage door G through the opening O, which is typically mitigated against by caulking the trim piece front edge E but which in turn has other downsides in terms of labor and material costs and appearance. It is thus proposed as shown that an inflatable seal apparatus 20 employed such as in the most forward groove K or the groove K closest to the trim piece front edge E so as to seal between the trim piece body B and the door frame such as the door jamb J illustrated in FIG. 13. And as shown, the inflatable seal apparatus 20 may again comprise an elongate annular inflatable member 40 having a side wall 42 and an end wall 44 in which is operably positioned the inflation valve 46. Those skilled in the art will appreciate that by accessing the valve 46 from the end of the trim piece T the inflatable member 40 can thus be inflated or deflated as needed for setting and sealing the trim piece body B against the door frame. However, it will be further appreciated that in this configuration, while relatively simple, pressurization or inflation or deflation of the inflatable seal apparatus 20 via the valve 46 of the inflatable member 40 must typically be done prior to then installing the apparatus 20 and trim piece T on the door frame, as once the trim piece T is installed the inflatable member 40 and its valve 46 typically would not be accessible. Relatedly, as also noted with reference to FIG. 13, the fastener A used to install the trim piece T on the door frame or jamb J should pass through the trim piece body B at a location other than opposite the groove K in which the inflatable member 40 is positioned so as to not puncture or otherwise damage the inflatable member 40. Furthermore, those skilled in the art will appreciate that in installing any such trim seal T it is typically cut to the desired length in the field corresponding to the dimensions of the opening O, in which case the inflatable member 40 may also be cut to the appropriate length opposite the end wall 44 with valve 46 and resealed in the field using heat, an adhesive, a crimp, or any other device or technique now known or later developed for selectively closing such a flexible tube-like component. As shown in FIG. 13, then, when the trim seal T is installed on a door frame such as in a vertical orientation on an exemplary jamb J as through positioning the selectively pressurized inflatable seal apparatus 20 in one of the inwardly-facing grooves K such as again closest to the front edge E and then inserting one or more fastener A from the outwardly-oriented face surface I through the body B and into the adjacent jamb J, the rear flap F is oriented toward and configured to make sealing contact with the perimeter face of the garage door G when closed in a manner known in the art and the inflatable member 40 is thus oriented toward and configured to make sealing contact with the door frame or jamb J as shown when the trim seal T is installed vertically or with the header H (FIG. 1) if the trim seal T were installed horizontally.

Figure 14:
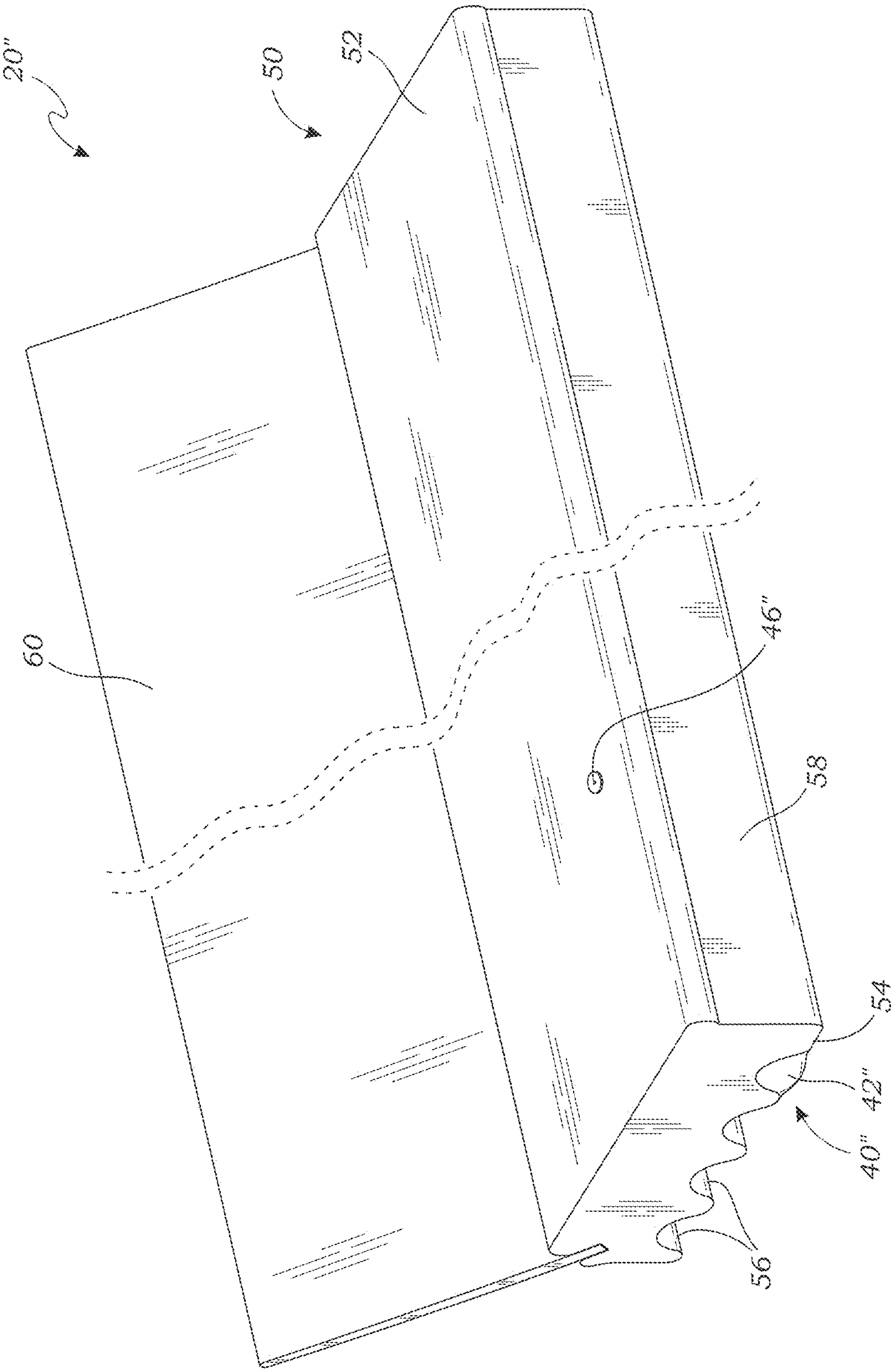
FIG. 14 is a partial perspective view of a trim seal having installed therewith a fourth exemplary inflatable seal apparatus, in accordance with at least one embodiment.
Figure 15:
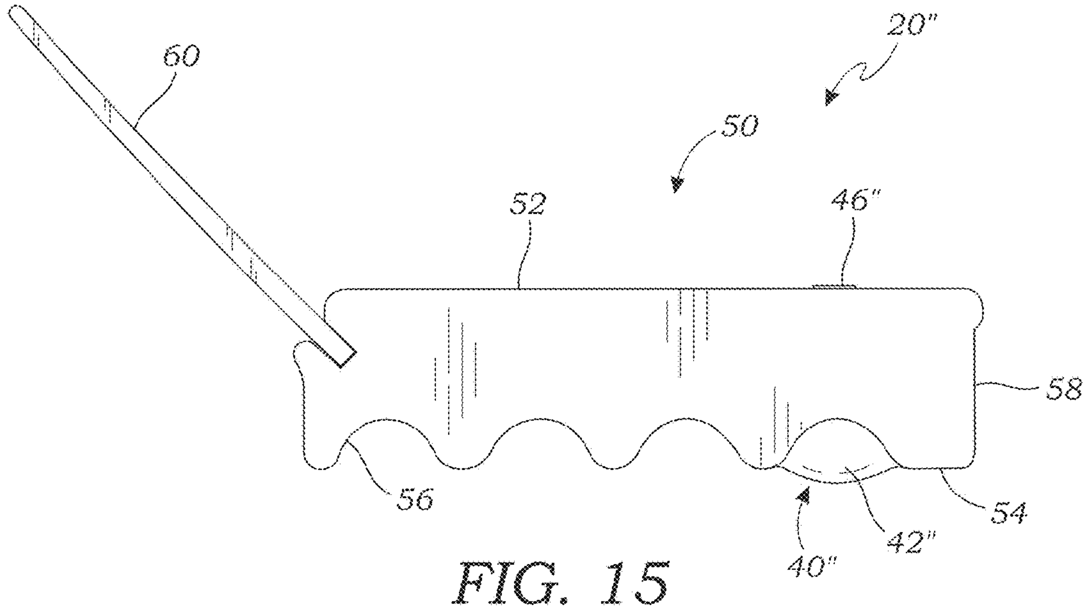
FIG. 15 is an end view thereof, in accordance with at least one embodiment.
Figure 16:
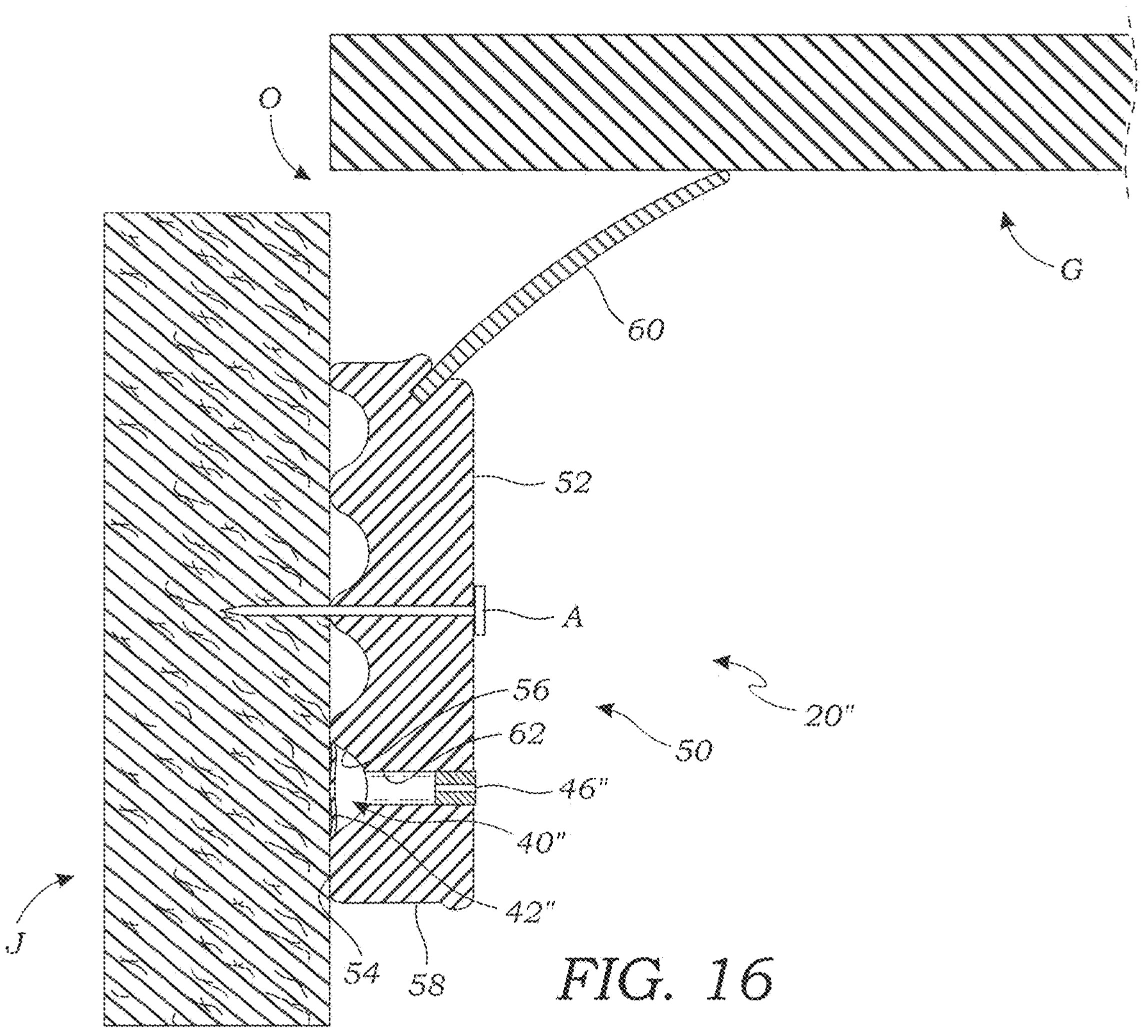
FIG. 16 is a reduced-scale cross-sectional end view thereof as installed on a door frame adjacent to an overhead garage door, in accordance with at least one embodiment.

Finally, turning to FIGS. 14-16, there is shown an alternative exemplary purpose-built trim piece-type inflatable seal apparatus 20" as again having a body 50 with an outer face 52, an opposite inner surface 54 with grooves 56, a front edge 58, and a rearwardly-oriented flexible flap 60, with there again being a variety of configurations relating to how and from where the flap 60 extends from the back area of the body 50. Notably, a seal element or inflatable member 40" is incorporated within or otherwise operably configured along the back or grooved surface 54 of the trim seal body 50, here once again within the most forward groove 56 so as to seal between the body 50 and the door frame jamb J or header H (FIG. 1), rather than separately inserting an inflatable member 40 within such groove K as in the exemplary embodiment of FIGS. 11-13. In such alternative embodiment, the inflatable member 40" thus is formed as a wall 42" spanning and sealing the groove 56 so as to enclose a volume or space between the groove 56 of the body 50 and the wall 42" of the inflatable member 40". And thus to pressurize or inflate or deflate the inflatable member 40", here an inflation valve 46" is operably installed in a hole 62 formed within the trim piece body 50 intersecting or communicating between the outer face 52 and the groove 56, the valve 46" being substantially flush with the outer face 52 or recessed beneath the outer face 52 so as to again be low-profile and less susceptible to damage. It will be appreciated that in such alternative trim piece-type inflatable seal apparatus 20" the inflatable member 40" may thus be conveniently pressurized via the valve 46" that is accessible even after the trim piece apparatus 20" is installed. And as noted previously related to cutting the trim piece-type inflatable seal apparatus 20" to length during installation, the inflatable member 40" thereof may also be cut to the appropriate length at either or both ends and resealed in the field using heat, an adhesive, a crimp, or any other device or technique now known or later developed for selectively closing such a flexible tube-like component. Those skilled in the art will appreciate that the lengthwise inflatable member 40" and specifically its side wall 42" may be positioned in and along one of the grooves 56 of the bottom face 54, again, in the illustrated embodiment the last such groove 56, so as to arcuately span the groove 56 and in its at rest state bow or extend away from and at its apex beyond the bottom surface 54 as best seen in FIG. 15 and thus naturally flex and flatten and seal between the trim piece body 50 and the door frame jamb J or header H when such inflatable seal apparatus 20" is installed as seen in FIG. 16. And once again, even after so installed, the inflatable member 40" can be selectively inflated or deflated via the exposed valve 46" and an appropriate pump with needle. It will be appreciated that the side wall 42" forming the inflatable member 40" may be co-extruded with the trim seal body 50 even of a different durometer material just as the rear flap 60, though such is not necessarily the case and the inflatable member 40" and its side wall 42" may be formed or assembled onto or formed integrally with the trim piece body 50 employing any appropriate manufacturing or assembly technique and any appropriate materials now known or later developed without departing from the spirit and scope of the invention. It is further again noted that while the inflatable member 40" is shown as being installed in the last groove 56 in the grooved inner surface 54 or the groove 56 closest to the front edge 58, such is not necessarily the case. Moreover, more than one inflatable member 40" whether or not of the same type or configuration can be employed in multiple grooves 56 in the grooved surface 54 for further sealing effects, and that in accordance with either exemplary embodiment of FIGS. 11-16 or any other such configuration consistent with aspects of the present invention. Such combinations of sealing features are within the scope of the present invention and aspects of the disclosed inflatable seal apparatus 20.

Any such inflatable seal apparatus 20 according to aspects of the present invention may be of unitary construction as a single extrusion or the like, and that even if in conjunction with other structure such as a bottom seal W or trim seal T as shown and described herein and thus potentially a dual durometer vinyl or other such material as is known in the art such that particularly any wall 42, 44 of such an inflatable member 40 of any such inflatable seal apparatus 20 may be sufficiently thin and flexible and elastic to allow for the desired pressurization or inflation and deflation of the one or more inflatable member 40. Alternatively, such inflatable member 40 and any wall 42, 44 thereof may be formed separately and as appropriate installed or assembled in or on other related components such as a bottom seal W or trim seal T. In any event, once more, a resulting single inflatable seal apparatus 20 as shown and described may be formed, cut to length, and installed on the bottom of a garage door G or on the frame of a garage door opening O so as to seal about the perimeter of the garage door G within the opening O when closed, providing a relatively simple and inexpensive and improved solution to effectively sealing the gap between the garage door G and the floor L or frame jamb J or header H about the garage door opening O. Dimensionally, the typical gap between the bottom of the garage door G and the floor L and the typical thickness of the trim seal body T being approximately one-half inch (0.5 in.), it follows that the inflatable member 40 would have a nominal transverse dimension also of on the order of one-quarter inch to three-quarter inch (0.25-0.75 in.) depending on a number of factors, though it will be appreciated by those skilled in the art that a variety of other geometrical configurations or sizes and shapes of the inflatable member 40 may be employed according to aspects of the present invention without departing from its spirit and scope. Fundamentally, in forming the inflatable seal 20) apparatus 20 and its inflatable member 40 according to aspects of the present invention, it will be appreciated that any appropriate materials and methods of construction now known or later developed may be employed, including but not limited to vinyl and other rubbers in a variety of durometers, any such components being fabricated or formed as through injection molding, extrusion, forming, or any other such technique now known or later developed. Relatedly, such components may be formed integrally such as through co-extrusion or may be formed separately and then assembled in any appropriate secondary operation employing any assembly technique now known or later developed, including but not limited to fastening, bonding, welding, over-molding or coining, press-fitting, snapping, or any other such technique now known or later developed. Those skilled in the art will fundamentally appreciate that any such materials and methods of construction are encompassed within the scope of the invention, any exemplary materials and methods in connection with any and all embodiments thus being illustrative and non-limiting.

Aspects of the present specification may also be described as the following numbered embodiments:

1. An inflatable seal apparatus for selectively sealing a garage door within an opening, the apparatus comprising a plurality of inflatable members arranged with a seal body configured for selectively sealing the garage door opening, each inflatable member having one or more of an inflatable member side wall and an inflatable member end wall and having an inflation valve operably installed within the inflatable member side wall or the inflatable member end wall so as to be accessible through the seal body.

2. The apparatus of embodiment 1, wherein: the seal body is a U-shaped body configured for installation on a bottommost rail of the garage door so as to selectively seal between the garage door and a floor beneath the garage door; and the plurality of inflatable members comprises two or more elongate inflatable members spanning the width of the garage door and positioned in a parallel lengthwise arrangement within the U-shaped body between the U-shaped body and the bottommost rail, with each elongate inflatable member having the inflation valve operably installed within the inflatable member end wall so as to be accessible from an end of the U-shaped body.

3. The apparatus of embodiment 2, wherein the U-shaped body has a U-shaped body end wall removably engaged with the end of the U-shaped body for selective access to the inflation valves of the elongate inflatable members.

4. The apparatus of embodiment 2, wherein the U-shaped body has a U-shaped body end wall integrally engaged with the end of the U-shaped body, and the inflation valves of the elongate inflatable members are accessible through the U-shaped body end wall.

5. The apparatus of embodiment 4, wherein the inflation valves are positioned within and are substantially flush with the U-shaped body end wall.

6. The apparatus of any of embodiments 2-5, wherein the U-shaped body has a U-shaped body end wall integrally engaged with the U-shaped body opposite the end allowing access to the inflation valves, the U-shaped body and the U-shaped body end wall configured to cooperate in protecting the elongate inflatable members.

7. The apparatus of any of embodiments 2-6, wherein the plurality of inflatable members comprises three annular elongate inflatable members spanning the width of the garage door and positioned in a parallel lengthwise arrangement within the U-shaped body between the U-shaped body and the bottommost rail.

8. The apparatus of embodiment 1, wherein: the seal body is a U-shaped body configured for installation on a bottommost rail of the garage door so as to selectively seal between the garage door and a floor beneath the garage door; and the plurality of inflatable members comprises two or more inflatable members positioned in an end-to-end widthwise arrangement within the U-shaped body between the U-shaped body and the bottommost rail, with each inflatable member having the inflation valve operably installed within the inflatable member side wall so as to be accessible through the U-shaped body.

9. The apparatus of embodiment 8, wherein the inflation valves are positioned within and are substantially flush with the U-shaped body.

10. The apparatus of embodiment 8 or embodiment 9, wherein the inflatable member side wall of each end-to-end inflatable member is integral with the U-shaped body.

11. The apparatus of any of embodiments 8-10, wherein a transverse intermediate wall is positioned within the U-shaped body between the end-to-end inflatable members so as to separate two adjacent end-to-end inflatable members.

12. The apparatus of embodiment 11, wherein each inflatable member comprises an inflatable member side wall and opposite inflatable member end walls, and each transverse intermediate wall is between and adjacent to opposite inflatable member end walls.

13. The apparatus of embodiment 11 or embodiment 12, wherein each inflatable member comprises an inflatable member side wall and opposite inflatable member end walls, and each inflatable member end wall is integral with the respective transverse intermediate wall.

14. The apparatus of embodiment 1, wherein: the seal body is a trim piece body configured for installation on a door frame header or jamb of the garage door opening adjacent to the garage door so as to selectively seal between the trim piece body and both the garage door and the door frame header or jamb; and the plurality of inflatable members comprises two or more elongate inflatable members spanning the length of the door frame header or jamb of the garage door and positioned in a parallel lengthwise arrangement within a lengthwise groove formed in an inner face of the trim piece body so as to seal between the trim piece body and the door frame header or jamb.

15. The apparatus of embodiment 14, wherein each elongate inflatable member has the inflation valve operably installed within the inflatable member end wall so as to be accessible from an end of the trim piece body.

16. The apparatus of embodiment 14, wherein each inflatable member has the inflation valve operably installed within the inflatable member side wall so as to be accessible through the trim piece body.

17. The apparatus of embodiment 16, wherein the inflation valves are positioned within and are substantially flush with an outer face of the trim piece body opposite of the inner face.

18. The apparatus of embodiment 17, wherein a hole is formed in the trim piece body so as to communicate between the outer face and the respective lengthwise groove, the respective inflation valve being positioned in the hole.

19. The apparatus of embodiment 17 or embodiment 18, wherein the inflatable member side wall and the inflatable member end wall of each elongate inflatable member are integral with the trim piece body spanning the respective lengthwise groove.

20. A method of employing an inflatable seal apparatus as defined in any one of embodiments 1-19, the method comprising the steps of: installing the seal body having at least one of the plurality of inflatable members on one of the bottommost rail of the garage door or the door frame header or jamb of the garage door opening adjacent to the garage door; and selectively inflating or deflating each inflatable member so as to selectively seal between the seal body and the floor beneath the garage door or between the seal body and the door frame header or jamb of the garage door opening.

21. The method of embodiment 20, wherein the step of installing the seal body having at least one of the plurality of inflatable members comprises positioning at least two of the plurality of inflatable members lengthwise in a parallel arrangement within the seal body.

22. The method of embodiment 21, wherein the step of positioning at least two of the plurality of inflatable members lengthwise in a parallel arrangement within the seal body is performed after the seal body configured as a U-shaped body is installed on the bottommost rail of the garage door.

23. The method of embodiment 21 or embodiment 22, wherein the step of positioning at least two of the plurality of inflatable members lengthwise in a parallel arrangement within the seal body comprises enclosing the inflatable members within the seal body via the at least one selectively removably U-shaped body end wall.

24. The method of embodiment 20, wherein the step of installing the seal body having at least one of the plurality of inflatable members comprises positioning at least one of the plurality of inflatable members in a lengthwise groove formed within an inner face of the seal body configured as a trim seal body.

25. The method of embodiment 24, wherein a first inflatable member of the plurality of inflatable members is installed in a lengthwise groove of a trim seal body installed on one of the door frame jambs and a second inflatable member of the plurality of inflatable members is installed in a lengthwise groove of a trim seal body installed on the door frame header.

26. The method of any of embodiments 20-25, wherein the step of installing the seal body having at least one of the plurality of inflatable members comprises cutting the seal body configured as a trim seal body to a desired length.

27. The method of embodiment 26, wherein the step of installing the trim seal body comprises positioning the trim seal body directly onto the door frame defining the garage door opening such that the inner face and the at least one of the plurality of inflatable members are directly against the door frame so as to seal the garage door opening between the trim seal body and the door frame.

28. The method of embodiment 26 or embodiment 27, wherein the step of installing the cut trim seal body comprises passing fasteners through the trim seal body into the door frame without the fasteners passing through the at least one of the plurality of inflatable members.

29. The method of any of embodiments 20-28, comprising, prior to the step of installing the seal body having at least one of the plurality of inflatable members, cutting each inflatable member to a desired length and sealing the inflatable member where cut.

30. A kit comprising multiple inflatable seal apparatuses as defined in any one of embodiments 1-19.

31. The kit of embodiment 30, further comprising instructional material.

32. The kit of embodiment 31, wherein the instructional material provides instructions on how to perform the method as defined in any one of embodiments 20-29.

33. Use of an inflatable seal apparatus as defined in any one of embodiments 1-19 to seal between one or more of the garage door and the floor and the apparatus and the door frame defining the opening for the garage door.

34. The use of embodiment 33, wherein the use comprises a method as defined in any one of embodiments 20-29.

In closing, regarding the exemplary embodiments of the present invention as shown and described herein, it will be appreciated that an inflatable seal apparatus is disclosed and configured for effectively and relatively inexpensively and easily sealing against the floor and/or the door frame defining the overhead garage door opening. Because the principles of the invention may be practiced in a number of configurations beyond those shown and described, it is to be understood that the invention is not in any way limited by the exemplary embodiments, but is generally able to take numerous forms without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

In some embodiments, the numbers expressing quantities of components or ingredients, properties such as dimensions, weight, concentration, reaction conditions, and so forth, used to describe and claim certain embodiments of the inventive subject matter are to be understood as being modified in some instances by terms such as "about," "approximately," or "roughly." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in any specific examples are reported as precisely as practicable. The numerical values presented in some embodiments of the inventive subject matter may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. The recitation of numerical ranges of values herein is merely intended to serve as a shorthand method of referring individually to each separate value falling within the range. Unless otherwise indicated herein, each individual value of a numerical range is incorporated into the specification as if it were individually recited herein. Similarly, all lists of values should be considered as inclusive of intermediate values unless the context indicates the contrary.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators-such as "first," "second," "third," etc.—for identified elements are used to distinguish between the elements, and do not indicate or imply a required or limited number of such elements, and do not indicate a particular position or order of such elements unless otherwise specifically stated.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the application should be construed as indicating any non-claimed element essential to the practice of the invention.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C and N, the text should be interpreted as requiring only one element from the group, not A plus N, or B plus N, etc.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. An inflatable seal apparatus for selectively sealing a garage door within an opening, the apparatus comprising:

a seal body formed as a U-shaped body configured for installation on a bottommost rail of the garage door so as to selectively seal between the garage door and a floor beneath the garage door; and two or more inflatable members positioned in an end-to-end widthwise arrangement within the U-shaped body between the U-shaped body and the bottommost rail, with the inflatable members not in fluid communication and each inflatable member having an inflation valve operably installed within a respective inflatable member side wall of each inflatable member so as to be accessible through the U-shaped body for selectively manually inflating each inflatable member independently.

2. The apparatus of claim 1, wherein the U-shaped body has a U-shaped body end wall removably engaged with the end of the U-shaped body.

3. The apparatus of claim 1, wherein the U-shaped body has a U-shaped body end wall integrally engaged with the end of the U-shaped body.

4. The apparatus of claim 1, wherein the inflation valves are positioned within and are substantially flush with the U-shaped body.

5. The apparatus of claim 4, wherein the inflatable member side wall of each end-to-end inflatable member is integral with the U-shaped body.

6. The apparatus of claim 1, wherein a transverse intermediate wall is positioned within the U-shaped body between the end-to-end inflatable members so as to separate two adjacent end-to-end inflatable members.

7. The apparatus of claim 6, wherein each inflatable member further comprises opposite inflatable member end walls, and each transverse intermediate wall is between and adjacent to opposite inflatable member end walls.

8. The apparatus of claim 6, wherein each inflatable member further comprises opposite inflatable member end walls, and each inflatable member end wall is integral with the respective transverse intermediate wall.

9. The apparatus of claim 1, wherein each inflation valve is configured as a rubber check valve.

10. An inflatable seal apparatus for selectively sealing a garage door within an opening, the apparatus comprising:

a seal body formed as a trim piece body configured for installation on a door frame header or jamb of the garage door opening adjacent to the garage door so as to selectively seal between the trim piece body and both the garage door and the door frame header or jamb; and at least one inflatable member spanning the length of the door frame header or jamb of the garage door and positioned in a parallel lengthwise arrangement within a lengthwise groove formed in an inner face of the trim piece body so as to seal between the trim piece body and the door frame header or jamb, each inflatable member having one or more of an inflatable member side wall and an inflatable member end wall and having an inflation valve operably installed within the inflatable member side wall or the inflatable member end wall so as to be accessible through the seal body.

11. The apparatus of claim 10, wherein each inflatable member has the inflation valve operably installed within the inflatable member end wall so as to be accessible from an end of the trim piece body.

12. The apparatus of claim 10, wherein each inflatable member has the inflation valve operably installed within the inflatable member side wall so as to be accessible through the trim piece body.

13. The apparatus of claim 12, wherein the inflation valves are positioned within and are substantially flush with an outer face of the trim piece body opposite of the inner face.

14. The apparatus of claim 13, wherein a hole is formed in the trim piece body so as to communicate between the outer face and the respective lengthwise groove, the respective inflation valve being positioned in the hole.

15. The apparatus of claim 13, wherein the inflatable member side wall and the inflatable member end wall of each inflatable member are integral with the trim piece body spanning the respective lengthwise groove.

* * * * *